US 11,763,036 B2

(12) United States Patent
Lu et al.

(10) Patent No.: US 11,763,036 B2
(45) Date of Patent: Sep. 19, 2023

(54) METHOD FOR SECURE INTERACTION ON UNIVERSAL PLATFORM AND SMART TERMINAL

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 183 days.

(21) Appl. No.: 17/045,142

(22) PCT Filed: Apr. 10, 2019

(86) PCT No.: PCT/CN2019/081990
§ 371 (c)(1),
(2) Date: Oct. 2, 2020

(87) PCT Pub. No.: WO2019/210767
PCT Pub. Date: Nov. 7, 2019

(65) Prior Publication Data
US 2021/0150067 A1 May 20, 2021

(30) Foreign Application Priority Data
May 4, 2018 (CN) .......................... 201810417700.9

(51) Int. Cl.
G06F 21/74 (2013.01)
G06F 3/0484 (2022.01)
(Continued)

(52) U.S. Cl.
CPC ............ G06F 21/74 (2013.01); G06F 3/0484 (2013.01); G06F 3/04886 (2013.01); G06F 21/31 (2013.01); G06F 21/36 (2013.01)

(58) Field of Classification Search
None
See application file for complete search history.

(56) References Cited

U.S. PATENT DOCUMENTS 9,483,653 B2 * 11/2016 Dai Zovi ................. G06F 21/84
9,891,823 B2 * 2/2018 Feng ..................... G06F 3/04886
(Continued)

OTHER PUBLICATIONS

Sun, H., Sun, K., Wang, Y. and Jing, J., Oct. 2015. TrustOTP: Transforming smartphones into secure one-time password tokens. In Proceedings of the 22nd ACM SIGSAC Conference on Computer and Communications Security (pp. 976-988). (Year: 2015).*

(Continued)

Primary Examiner — James R Turchen
(74) Attorney, Agent, or Firm — Hammer & Associates, P.C.

(57) ABSTRACT

A method for secure interaction on a universal platform. The method comprises: when a verification code needs to be inputted, a universal platform transmits a switching notification to a security chip via a secure interface; when the security chip receives the switching notification, same controls a switching circuit to switch a touch input module and a display module to be controlled by the security chip, controls the display module to prompt a user to input the verification code, controls, on the basis of coordinate data, the display module to generate and display a keyboard, acquires from the touch input module verification code coordinate information generated by the touch input module on the basis of screen-touching information of the user, produces the verification code on the basis of the verification code coordinate information and of the coordinate data, encrypts the produced verification code to produce a verification code ciphertext, outputs the verification code ciphertext via a preset interface, and controls the switching circuit to switch the touch input module and the display device to (Continued)

be controlled by the universal platform. The present invention prevents losses incurred by a verification code leakage.

10 Claims, 4 Drawing Sheets

(51) Int. Cl.
*G06F 3/04886* (2022.01)
*G06F 21/31* (2013.01)
*G06F 21/36* (2013.01)

(56) References Cited

U.S. PATENT DOCUMENTS

| | | | |
|---|---|---|---|
| 10,552,619 B2* | 2/2020 | Xing | G06F 13/28 |
| 10,867,069 B2* | 12/2020 | Jeong | G06F 21/6245 |
| 11,003,745 B2* | 5/2021 | Yao | G06F 21/84 |
| 2013/0145475 A1* | 6/2013 | Ryu | G06F 21/31 |
| | | | 726/26 |
| 2014/0150056 A1* | 5/2014 | Williams | G06F 21/83 |
| | | | 726/2 |
| 2014/0372651 A1* | 12/2014 | Kanai | G06F 9/462 |
| | | | 713/100 |
| 2015/0074824 A1* | 3/2015 | Toda | G06F 21/78 |
| | | | 726/28 |
| 2015/0081257 A1* | 3/2015 | Cen | G06F 21/82 |
| | | | 703/2 |
| 2015/0089246 A1* | 3/2015 | Kanai | G06F 12/1491 |
| | | | 713/193 |
| 2016/0283944 A1 | 9/2016 | Hubbard et al. | |
| 2018/0374392 A1* | 12/2018 | Ollivier | G07F 7/1041 |
| 2021/0117546 A1* | 4/2021 | Finchelstein | G06F 21/575 |

OTHER PUBLICATIONS

Sreenath, A.K., Dileep, K. and Chaithanya, B., Aug. 2018. A Novel Approach towards Secure IO Transactions Implementation and Validation for Smart Phones. In 2018 IEEE Distributed Computing, VLSI, Electrical Circuits and Robotics (DISCOVER) (pp. 1-6) IEEE. (Year: 2018).*

* cited by examiner

METHOD FOR SECURE INTERACTION ON UNIVERSAL PLATFORM AND SMART TERMINAL

FIELD OF THE INVENTION

The present invention relates to a method for safe interacting on a general platform and a smart terminal, which belongs to the security technology field.

PRIOR ART

With widely using of smart terminals, the safe problems of the smart terminals attract attention of users gradually. Source codes of general platforms of the smart terminals, such as Android, UNIX, XENIX, LINUX, Netware, etc., are open source. When the general platform has any loop, some sensitive data is easier to be leaking out. For example, most smart POS machines in prior art use Android as the general platform and communicate with host computers via the platform. In a process of inputting a verification code and/or transaction amount by a user, the risk that the verification code is stolen or the transaction amount is tampered is increased if the Android system has the loop. Once the verification code is stolen or the transaction amount is tampered, economic damage may be brought to the user. In a case that a user uses a smart terminal logon system with Android system, when the user uses the verification code to logon for verification, the verification code is easily stolen if the Android is vulnerable. If the verification code is stolen, the data of the user in the system is leaked out, which causes loss which could be avoided.

SUMMARY OF THE INVENTION

The object of the present invention is to provide a method for safe interacting on a general platform and a smart terminal, which can avoid loss caused by leaking of a verification code.

Therefore, according to one aspect of the present invention, there is provided a method for safe interacting on a general platform, which is applied to a smart terminal including the general platform, a security chip, a switching circuit, a touching and inputting module and a displaying module; the general platform is connected to the security chip via a security interface, and the general platform and the security chip are connected to the touching and inputting module and the displaying module via the switching circuit; the method includes the following steps:

Step S1, when a verification code is required to be input, the general platform sends a switching notification to the security chip via the security interface;

Step S2, when the security chip receives the switching notification, the security chip controls the switching circuit to make the touching and inputting module and the displaying module controlled by the security chip;

Step S3, the security chip controls the displaying module to prompt a user to input a verification code and controls the displaying module to generate and display a keyboard according to coordinate data;

Step S4, the security chip obtains verification code coordinate information, which is generated by the touching and inputting module according to screen touching information of the user, from the touching and inputting module, obtains the verification code according to the verification code coordinate information and the coordinate data; and Step S5, the security chip encrypts the obtained verification code to obtain verification code ciphertext, outputs the verification code ciphertext via a preset interface, controls the switching circuit to make the touching and inputting module and the displaying module controlled by the general platform.

Preferably, that the general platform and the security chip are connected to the touching and inputting module and the displaying module via the switching circuit can be replaced with that the general platform and the security chip are connected to the touching and inputting module via the switching circuit, the displaying module is connected to the general platform;

Correspondingly, Steps S2 to S3 are replaced with, respectively, when the security chip receives the switching notification, the security chip controls the switching circuit to make the touching and inputting module controlled by security chip, sends a notification that switching is successful to the general platform via the security interface; and when the general platform receives the notification that switching is successful, the general platform controls the displaying module to prompt the user to input the verification code, and controls the displaying module to generate and display the keyboard according to the coordinate data.

In Step S5, that the security chip controls the switching circuit to make the touching and inputting module and the displaying module controlled by the general platform can be replaced with that the security chip controls the switching circuit to make the touching and inputting module controlled by the general platform.

Preferably, that the general platform and the security chip are connected to the touching and inputting module and the displaying module via the switching circuit is replaced with that the general platform and the security chip are connected to the displaying module via the switching circuit and the touching and inputting module is connected to the general platform.

Correspondingly, Step S2 is replaced with: when the security chip receives the switching notification, the security chip controls the switching circuit to make the displaying module controlled by the security chip.

Step S3 further includes that the security chip sends a notification that switching is successful to the general platform via the security interface.

Steps S4-S5 can be replaced with, respectively, that:

when the general platform receives the notification that switching is successful, the general platform obtains the verification code coordinate information, which is generated by the touching and inputting module according to screen touching information of the user, from the touching and inputting module, obtains the verification code according to the verification code coordinate information and the coordinate data, sends the verification code to the security chip; and when the security chip receives the verification code, the security chip encrypts the verification code to obtain verification code ciphertext, outputs the verification code ciphertext via a preset interface, controls the switching circuit to make the displaying module controlled by the general platform.

According to another aspect of the present invention, there is provided a smart terminal for safe interacting on a general platform, in which the smart terminal includes the general platform, a security chip, a switching circuit, a touching and inputting module and a displaying module; the general platform is connected to the security chip via the security interface, and the general platform and the security chip are connected to the touching and inputting module and the displaying module via the switching circuit;

the general platform includes:
a first switching notifying module configured to, when a verification code is required to be input, send a switching notification to the security chip via the security interface;
the security chip includes:
a first receiving module configured to receive the switching notification from the general platform;
the first controlling module configured to, when the first receiving module receives the switching notification, control the switching circuit to make the touching and inputting module and the displaying module controlled by the security chip;
a second controlling module configured to control the displaying module to prompt a user to input a verification code after the first controlling module controls the switching circuit to make the touching and inputting module and the displaying module controlled by the security chip;
a third controlling module configured to control the displaying module to generate and display a keyboard according to coordinate data after the first controlling module controls the switching circuit to make the touching and inputting module and the displaying module controlled by the security chip;
a first obtaining module is configured to obtain verification code coordinate information, which is generated by the touching and inputting module according to screen touching information of the user, from the touching and inputting module, and obtain the verification code according to the verification code coordinate information and the coordinate data;
an encrypting module configured to encrypt the verification code obtained by the first obtaining module to obtain verification code ciphertext;
an outputting module configured to output the verification code ciphertext obtained by the encrypting module via a preset interface; and
the first controlling module further configured to, after the outputting module outputs the verification code ciphertext obtained by the encrypting module via the preset interface, control the switching circuit to make the touching and inputting module and the displaying module controlled by the general platform.

Preferably, the general platform and the security chip are connected to the touching and inputting module and the displaying module via the switching circuit is replaced with that the general platform and the security chip are connected to the touching and inputting module via the switching circuit, the displaying module is connected to the general platform.

Correspondingly, the first controlling module is replaced with a fourth controlling module, the second controlling module is replaced with a fifth controlling module, the third controlling module is replaced with a sixth controlling module;

the fourth controlling module is configured to, when the first receiving module receives the switching notification, control the switching circuit to make the touching and inputting module controlled by the security chip and send a notification that switching is successful to the general platform via the security interface;

the general platform further includes a third receiving module;
the third receiving module is configured to receive the notification that switching is successful from the security chip;
the fifth controlling module is configured to, when the third receiving module receives the notification that switching is successful from the security chip, control the displaying module to prompt the user to input the verification code;
the sixth controlling module is configured to, when the third receiving module receives the notification that switching is successful from the security chip, control the displaying module to generate and display the keyboard according to the coordinate data; and
the fourth controlling module is further configured to, after the outputting module obtains the verification code ciphertext obtained by the encrypting module via the preset interface, control the switching circuit to make the touching and inputting module controlled by the general platform.

Preferably, that the general platform and the security chip are connected to the touching and inputting module and the displaying module via the switching circuit can be replaced with that the general platform and the security chip are connected to the displaying module via the switching circuit and the touching and inputting module is connected to the general platform;

correspondingly, the first controlling module is replaced with a seventh controlling module;
the seventh controlling module is configured to, when the first receiving module receives the switching notification, control the switching circuit to make the displaying module controlled by the security chip;
the security chip further includes a first sending module and a second receiving module;
the first sending module is configured to make the seventh controlling module to control the switching circuit to make the displaying module controlled by the security chip and sends the notification that switching is successful to the general platform via the security interface;
the first obtaining module is replaced with a second obtaining module, the general platform further includes a second sending module;
the second obtaining module is configured to, when receiving the notification that switching is successful, obtain the verification code coordinate information, which is generated by the touching and inputting module according to the screen touching information of the user, from the touching and inputting module, obtain the verification code according to the verification code coordinate information and the coordinate data;
the second sending module is configured to send the verification code obtained by the second obtaining module to the security chip via the security interface;
the second receiving module is configured to receive the verification code from the general platform;
the encrypting module specifically is configured to encrypt the verification code received by the second receiving module to obtain the verification code ciphertext; and
the seventh controlling module is further configured to, after the outputting module outputs the verification code ciphertext obtained by the encrypting module via the preset interface, control the switching circuit to make the displaying module controlled by the general platform.

As one of advantages of the present invention, before a user inputs the verification code, the security chip makes the displaying module and/or the touching and inputting module controlled by the security chip; in this case, even if any loop exists at the platform, the verification code input by the user cannot be stolen by others, which guarantees security in process of inputting the verification code, and avoids any loss resulted from possible verification code leaking.

DETAILED DESCRIPTION

Technical solutions of the embodiments of the present invention are described clearly and completely in conjunction with the accompanying drawings of the present disclosure as follows.

Embodiment 1

Figure 1:
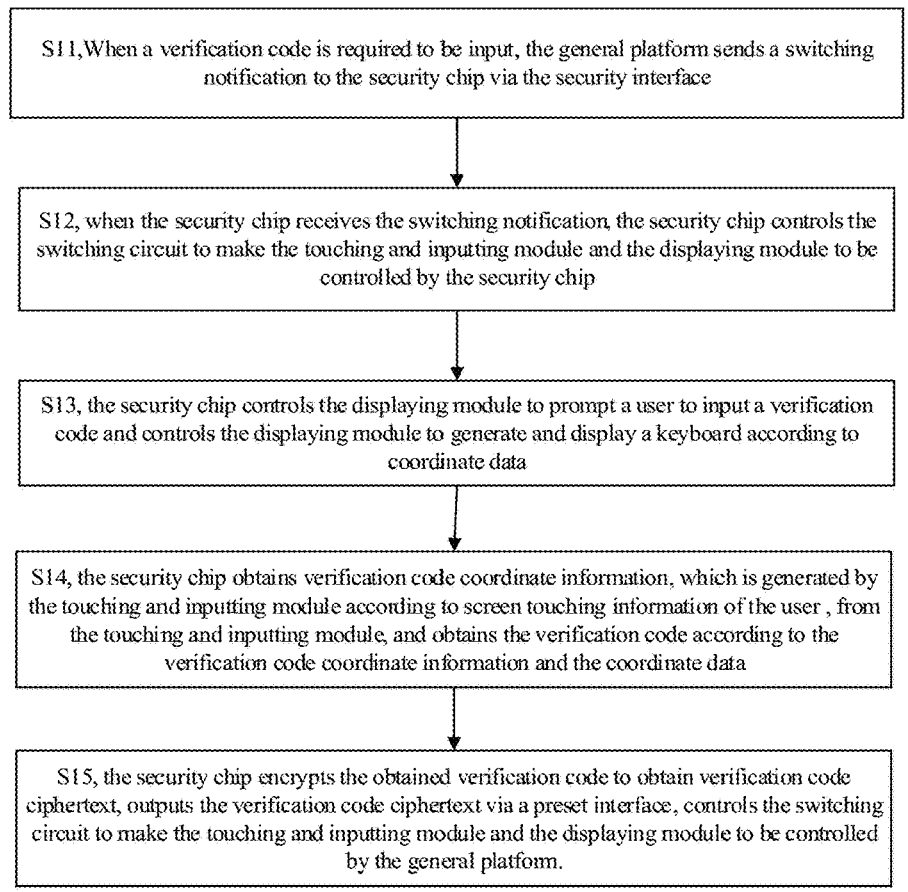
FIG. 1 is a flow chart of a method for safe interacting on a general platform in Embodiment 1 of the present disclosure.

Embodiment 1 provides a method for safe interacting on a general platform, and the method is applied to a smart terminal including the general platform, a security chip, a switching circuit, a touching and inputting module and a displaying module; the general platform is connected to the security chip via a security interface, the general platform and the security chip are connected to the touching and inputting module and the displaying module via the switching circuit;

As shown in FIG. 1, the method provided by Embodiment 1 includes the following steps:

Step S11, when a verification code is required to be input, the general platform sends a switching notification to the security chip via the security interface;

Step S12, when the security chip receives the switching notification, the security chip controls the switching circuit to make the touching and inputting module and the displaying module controlled by the security chip;

Step S13, the security chip controls the displaying module to prompt a user to input a verification code and controls the displaying module to generate and display a keyboard according to coordinate data;

Step S14, the security chip obtains verification code coordinate information, which is generated by the touching and inputting module according to screen touching information of the user, from the touching and inputting module, and obtains the verification code according to the verification code coordinate information and the coordinate data; and Step S15, the security chip encrypts the obtained verification code to obtain verification code ciphertext, outputs the verification code ciphertext via a preset interface, controls the switching circuit to make the touching and inputting module and the displaying module controlled by the general platform.

Preferably, in Embodiment 1, after the security chip controls the switching circuit to make the touching and inputting module and the displaying module controlled by the security chip in Step S12, the switching circuit can be used as communicating channel between the security chip and the touching and inputting module and the displaying module; i.e. the security chip controls the displaying module to prompt the user to input the verification code via the switching circuit, that is, the communication channel, and controls the displaying module to generate and display the keyboard via the switching circuit according to the coordinate data in Step S13; the security chip obtains the verification code coordinate information, which is generated by the touching and inputting module according to the touching information of the user, from the touching and inputting module via the switching circuit in Step S14.

In Embodiment 1, in Step S12, after the security chip receives the switching notification, the method further includes that the security chip generates random coordinate data according to preset keyboard coordinates.

That the security chip controls the displaying module to generate and display the keyboard according to the coordinate data in Step S13 is that the security chip controls the displaying module to generate and display a random number keyboard according to the random coordinate data.

That the security chip obtains the verification code according to the verification code coordinate information and the coordinate data in Step S14 is that the security chip obtains the verification code according the verification code coordinate information and the random coordinate data.

Preferably, Step S11 further comprises: the general platform sends the preset keyboard coordinates to the security chip via the security interface.

That the security chip generates random coordinate data according to the preset keyboard coordinates in Step 12 includes that the security chip generates the random coordinate data according to the received preset keyboard coordinates.

Specifically, that the security chip generates random coordinate data according to the preset key board coordinates includes that the security chip generates a random keyboard value sequence and generates the random coordinate data according to the random keyboard value sequence and the preset keyboard coordinates.

Further, specifically, that the security chip generates the random keyboard value sequence includes the following steps:

Step M11, the security chip obtains a preset keyboard value sequence, uses the maximum keyboard value in the preset keyboard value sequence to set an initial value of a first index value, uses the minimum keyboard value in the preset keyboard value sequence to set an initial value of a second index value, takes the obtained keyboard value sequence as a current keyboard value sequence, takes the initial value of the first index value as a current first index value and takes the initial value of the second index value as a current second index value;

Step M12, the security chip invokes a random number generating function to generate a random number with one byte, performs bitwise AND operation on the generated random number and the current first index value to obtain a bitwise AND operation result;

Step M13, the security chip finds a keyboard value corresponding to position of the bitwise AND operation result from the current preset keyboard sequence, takes the found keyboard value as keyboard value which corresponds to the position of the current second index value in the random keyboard value sequence to obtain the current random keyboard value sequence; and Step M14, the security chip removes the keyboard value, which corresponds to the position of the bitwise AND operation result, in the current preset keyboard value sequence, refills the position of the removed keyboard value with the keyboard value behind the removed keyboard value in the current preset keyboard value sequence, takes the keyboard sequence obtained by refilling as the current preset keyboard value sequence, updates the current first index value and the current second index value, determines whether the updated current first index value and the updated current second index value overpasses number of the keyboard values of the preset keyboard value sequence, if yes, the current random keyboard value sequence is taken as a final random keyboard value sequence; otherwise, go back to Step M12.

For example, the obtained final random keyboard value sequence is 0x01, 0x09, 0x00, 0x08, 0x06, 0x07, 0x02, 0x03, 0x04, 0x05.

In Embodiment 1, before the verification code is required to be input, the method further includes that the general platform obtains transaction information.

In Step S11, when the verification code is required to be input, the method further includes that the general platform sends the transaction information to the security chip via the security interface.

Step S13 further includes that the security chip displays transaction amount according to the transaction information.

For example, the security chip controls the displaying module to prompt the user to input the verification code, generates and displays a keyboard according to the coordinate data and controls the displaying module to display transaction amount according to the transaction information, which is shown as follows:

| Y 123.00 | | |
|---|---|---|
| Input a verification code please | | |
| 1 | 9 | 0 |
| 8 | 6 | 7 |
| 2 | 3 | 4 |
| 5 | X | Ok |

Or, in Embodiment 1, when the verification code is required to be input, the method further includes that the general platform sends a request for obtaining verification code to the security chip via the security interface;

That the security chip controls the displaying module to prompt the user to input the verification code specifically is that the security chip controls the displaying module to prompt the user to input the verification code according to the request for obtaining verification code.

When the verification code is required to be input as described above, the method further includes the following steps:

Step A1, when transaction amount is required to be input, the general platform sends the switching notification and a request for obtaining transaction amount to the security chip via the security interface;

Step A2, when the security chip receives the switching notification and the request for obtaining transaction amount, the security chip controls the switching circuit to make the touching and inputting module and the displaying module controlled by the security chip;

Step A3, the security chip controls the displaying module to prompt the user to input the transaction amount according to the request for obtaining the transaction amount and controls the displaying module to generate and display the keyboard; and Step A4, the security chip obtains the transaction data coordinate information, which is generated by the touching and inputting module according to the screen touching information of the user, from the touching and inputting module, obtains the transaction amount data according to the transaction data coordinate information, sends the transaction amount data to the general platform via the security interface, and controls the switching circuit to make the touching and inputting module and the displaying module controlled by the general platform; and Step S13 further includes that the security chip controls the displaying module to display transaction amount according to the transaction amount data.

Specifically, that the security chip controls the displaying module to generate and display the keyboard is that the security chip generates random coordinate data according to the preset keyboard coordinates and controls the displaying module to generate and display the random number keyboard according to the random coordinate data; correspondingly, that the security chip obtains the transaction amount data according to the transaction data coordinate information is that the security chip obtains the transaction amount data according to the transaction data coordinate information and the random coordinate data.

In Embodiment 1, refer to Embodiment 4 for details about that the security chip generates the random coordinate data according to the preset keyboard coordinates, controls the displaying module to generate and display the random number keyboard according to the random coordinate data, which will not be reiterated here. For example, the generated random coordinate data is:

| 0 × 01, 0 × 00-0 × 04, 0 × 00-0 × 04 | 0 × 09, 0 × 04-0 × 08, 0 × 00-0 × 04 | 0 × 00, 0 × 08-0 × 12, 0 × 00-0 × 04 |
|---|---|---|
| 0 × 08, 0 × 00-0 × 04, 0 × 04-0 × 08 | 0 × 06, 0 × 04-0 × 08, 0 × 04-0 × 08 | 0 × 07, 0 × 08-0 × 12, 0 × 04-0 × 08 |
| 0 × 02, 0 × 00-0 × 04, 0 × 08-0 × 12 | 0 × 03, 0 × 04-0 × 08, 0 × 08-0 × 12 | 0 × 04, 0 × 08-0 × 12, 0 × 08-0 × 12 |
| 0 × 05, 0 × 00-0 × 04, 0 × 12-0 × 16 | 0 × 0A, 0 × 04-0 × 08, 0 × 12-0 × 16 | 0 × 0B, 0 × 08-0 × 12, 0 × 12-0 × 16 |

Or, specifically, that the security chip controls the displaying module to generate and display the keyboard is that the security chip controls the displaying module to generate and display the keyboard according to the preset coordinate data; correspondingly, the security chip obtains the transaction amount data according to the transaction data coordinate information specifically is that the security chip obtains the transaction amount data according to the transaction data coordinate information and the preset coordinate data.

In Embodiment 1, Step S14 specifically includes that when the touching and inputting module receives the touching information input by the user, the touching and inputting module generates verification code coordinate information according to the touching information and uses the generated verification code coordinate information to update data in its register and sends an interrupting notification to the security chip.

Step S141, the security chip receives the interruption notification from the touching and inputting module and reads the verification code coordinate information from the register of the touching and inputting module.

Step S142, the security chip finds the keyboard value, which corresponds to the read verification code coordinate information, from the random coordinate data; when the found keyboard value is number key, the security chip adds the found keyboard value, which is taken as one digit of the verification code, to the end of the current verification code sequence to obtain a new verification code sequence, takes the new verification code sequence as the current verification code sequence, controls the displaying module to display inputting one digit of data, go back to Step S141; when the found keyboard value is backspace key, controls the displaying module to display deleting one digit of data, go back to Step S141; when the found keyboard value is confirming key, controls the displaying module to display information that inputting verification code is completed and takes the current verification code sequence as verification code, go back to Step S15.

That the security chip receives the interruption notification of the touching and inputting module for the first time in Step S14, further includes that the security chip initializes the verification code sequence and takes the initialized verification code sequence as the current verification code sequence.

In Embodiment 1, when the preset interface is security interface, that the security chip outputs the verification code ciphertext via the preset interface specifically is that the security chip sends the verification code ciphertext to the general platform via the security interface.

When the preset interface is financial IC card interface, that the security chip outputs the verification code ciphertext via the preset interface specifically is that the security chip sends the verification code ciphertext to the financial IC card via the financial IC card interface.

In Embodiment 1, when the verification code is required to be input, the method further includes that the general platform sends the request for obtaining verification code to the security chip via the security interface.

That the security chip controls the displaying module to prompt the user to input the verification code is that the security chip controls the displaying module to prompt the user to input the verification code according to the request for obtaining verification code.

After Step S15, the method further includes the following steps:

Step A11, when transaction amount is required to be input, the general platform sends the switching notification and the request for obtaining transaction amount to the security chip via the security interface;

Step A12, when the security chip receives the switching notification and the request for obtaining transaction amount, the security chip controls the switching circuit to make the touching and inputting module and the displaying module controlled by the security chip;

Step A13, the security chip controls the displaying module to prompt the user to input transaction amount according to the request for obtaining transaction amount and controls the displaying module to generate and display the keyboard; and Step A14, the security chip obtains the transaction data coordinate information, which is generated by the touching and inputting module according to the screen touching information of the user, from the touching and inputting module, obtains the transaction amount data according to the transaction data coordinate information, sends the transaction amount data to the general platform via the security interface, controls the switching circuit to make the touching and inputting module and the displaying module controlled by the general platform.

In Embodiment 1, after the security chip obtains the transaction amount data, the security chip may encrypt the transaction amount data; correspondingly, that the security chip sends the transaction amount to the general platform via the security interface is that the security chip sends the encrypted transaction amount data to the general platform via the security interface.

In Embodiment 1, that the security chip obtains the transaction data coordinate information generated by the touching and inputting module according to the screen touching information of the user from the touching and inputting module, and obtains the transaction amount data according to the transaction data coordinate information specifically includes that whenever the touching and inputting module receives the touching information input by the user, the touching and inputting module generates transaction data coordinate information according to the touching information, uses the generated transaction data coordinate information to update the data in its register and sends the interruption notification to the security chip.

For example, when the touching and inputting module receives the screen touching information input by the user, the touching and inputting module generates verification code coordinate information, i.e. 0x01, 0x01, according to the screen touching information and uses the verification code coordinate information to update the data in its register.

Step H141, the security chip receives the interruption notification from the touching and inputting module, reads the transaction data coordinate information from the register of the touching and inputting module. For example, the security chip receives the interruption notification, the transaction data coordinate that the security chip read from the register of the touching and inputting module is 0x01, 0x01.

Step H142, the security chip finds the keyboard value corresponding to the read transaction data coordinate information from the coordinate data, if the found keyboard value is number key, adds to the found keyboard value, which is taken as one digit of the transaction amount data, after the current transaction amount data sequence to obtain a new transaction amount data sequence, takes the new transaction amount data sequence as the current transaction amount data sequence, controls the displaying module to display the current transaction amount data sequence, go back to Step H141; if the found keyboard value is backspace key, controls the displaying module to display the transaction amount data after deleting one digit of data, go back to Step H141; when the found keyboard value is confirming key, takes the current transaction amount sequence as final transaction amount data sequence and controls the displaying module to display the transaction amount according to the final transaction amount data sequence.

When the security chip receives the interruption notification of the touching and inputting module for the first time in Step H141, the method further includes that the security chip initializes the transaction amount data sequence and takes the initialized transaction amount data sequence as current transaction amount data sequence. For example, the initialized transaction amount data sequence is void.

In Embodiment 1, the keyboard values of number keys are from 0x00 to 0x09, the keyboard value of the backspace key is 0x0A, keyboard value of the confirming key is 0x0B. For example, when the transaction data coordinate information read from the register of the touching and inputting module by the security chips is 0x01, 0x01, the security chip finds the keyboard value, i.e. 0x01, which corresponds to the read verification code coordinate information, i.e. 0x01, 0x01, from the following random coordinate data:

| | | |
|---|---|---|
| 0 × 01, 0 × 00-0 × 04, 0 × 00-0 × 04 | 0 × 09, 0 × 04-0 × 08, 0 × 00-0 × 04 | 0 × 00, 0 × 08-0 × 12, 0 × 00-0 × 04 |
| 0 × 08, 0 × 00-0 × 04, 0 × 04-0 × 08 | 0 × 06, 0 × 04-0 × 08, 0 × 04-0 × 08 | 0 × 07, 0 × 08-0 × 12, 0 × 04-0 × 08 |
| 0 × 02, 0 × 00-0 × 04, 0 × 08-0 × 12 | 0 × 03, 0 × 04-0 × 08, 0 × 08-0 × 12 | 0 × 04, 0 × 08-0 × 12, 0 × 08-0 × 12 |
| 0 × 05, 0 × 00-0 × 04, 0 × 12-0 × 16 | 0 × 0A, 0 × 04-0 × 08, 0 × 12-0 × 16 | 0 × 0B, 0 × 08-0 × 12, 0 × 12-0 × 16 |

The found keyboard value 0x01 is number key, takes the found keyboard value 0x01 as one digit of the transaction amount data and adds the found keyboard value after the current transaction amount data sequence to obtain a new transaction amount data sequence 1, takes the new transaction amount data sequence as the current transaction amount data sequence, controls the displaying module to display the current transaction amount data according to the current transaction amount date sequence 1, go back to Step H141.

For example, when the current transaction amount data is void, takes the found keyboard value 0x01 as one digit of the transaction amount data and adds the found keyboard value after the current transaction amount data sequence to obtain the new transaction amount data sequence 1, takes the new transaction amount data sequence as the current transaction amount data sequence, controls the displaying module to display the current transaction amount data according to the current transaction amount data sequence 1; the current transaction amount data is as follows:

| Y 00.01 | | |
|---|---|---|
| 1 | 9 | 0 |
| 8 | 6 | 7 |
| 2 | 3 | 4 |
| 5 | X | Ok |

When the current transaction amount data sequence is 1, the found keyboard value is 0x02, takes 2 as one digit of the transaction amount data and adds 2 after the current transaction amount data sequence to obtain the new transaction amount data sequence 12, takes the new transaction amount data sequence 12 as the current transaction amount data sequence, controls the displaying module to display the current transaction amount data according to the current transaction amount data sequence 12, which is as follows:

| Y 00.12 | | |
|---|---|---|
| 1 | 9 | 0 |
| 8 | 6 | 7 |
| 2 | 3 | 4 |
| 5 | X | Ok |

Specifically, that the security chip finds the keyboard value 0x01, which corresponds to the read transaction data coordinate information, i.e. 0x01, 0x01, from the random coordinate data includes that the security chip finds the coordinates ranged from 0x00-0x04, 0x00-0x04, which correspond to the read transaction data coordinates 0x01, 0x01, from the random coordinate data, then finds the keyboard value 0x01, which corresponds coordinate values ranged from 0x00-0x04, x00-0x04.

When the security chip reads the transaction data coordinated information is 0x05, 0x14 from the register of the touching and inputting module, the security chip finds keyboard value, which is keyboard value of backspace key, i.e. 0x0A, controls the displaying module to display the transaction amount data after deleted one digit of the transaction amount data; go back to Step H141.

For example, when the current transaction amount data sequence is 12, the security chip finds that the keyboard value is the keyboard value of the backspace key, i.e. 0x0A, and controls the displaying module to display the transaction amount data after deleted one digit of the transaction amount data, which is as follows:

| Y 00.01 | | |
|---|---|---|
| 1 | 9 | 0 |
| 8 | 6 | 7 |
| 2 | 3 | 4 |
| 5 | X | Ok |

Specifically, when the transaction data coordinate information read from the register of the touching and inputting module by the security chip is 0x05, 0x14, the found keyboard value is the keyboard value, i.e. 0x0A, of the backspace key, which is specifically that when the transaction data coordinate information read from the register of the touching and inputting module by the security chip is 0x05, 0x14, the coordinate value range corresponding to 0x05, 0x14 is 0x04-0x08, 0x12-0x16, the keyboard value, i.e. 0x0A, of the backspace key is the keyboard value correspond to the coordinate value range 0x04-0x08, 0x12-0x16.

When the transaction data coordinate information read by the security chip from the register of the touching and inputting module is 0x09, 0x15, the found keyboard value is the keyboard value, i.e. 0x0B, of the confirming key, the current transaction amount data sequence 12300 is taken as the transaction amount data sequence, the security chip controls the displaying module to display the transaction amount 123.00 according to the final transaction amount data sequence 12300.

Specifically, that when the transaction data coordinate information read by the security chip from the register of the touching and inputting module is 0x09, 0x15, the found keyboard value is the keyboard value, i.e. 0x0B, of the confirming key specifically is that when the transaction data coordinate information read by the security chip from the register of the touching and inputting module is 0x09, 0x15, the found coordinate value range corresponding to 0x05, 0x14 is 0x08-0x12, 0x12-0x16; the found keyboard value of the confirming key corresponding to the coordinate value range, i.e. 0x08-0x12, 0x12-0x16, is the keyboard value of the confirming key 0x0B.

The advantages of Embodiment 1 are that, before the user inputs a verification code and transaction amount, the security chip makes the displaying module and the touching and inputting module controlled by the security chip. Even if the general platform exists vulnerability, the verification code input by the user cannot be stolen and the transaction amount input by the user cannot be tampered, which assures the safety in a process of inputting the verification code and the transaction amount by the user, and avoids loss brought by leaking of the verification code and the tampering transaction amount.

Embodiment 2

Embodiment 2 provides a method for safe interacting on a general platform, and the method is applied to a smart terminal including the general platform, a security chip, a switching circuit, a touching and inputting module and a displaying module; the general platform is connected to the security chip via a security interface, and the general platform and the security chip are connected to the touching and inputting module via the switching circuit, the displaying module is connected to the general platform.

Figure 2:
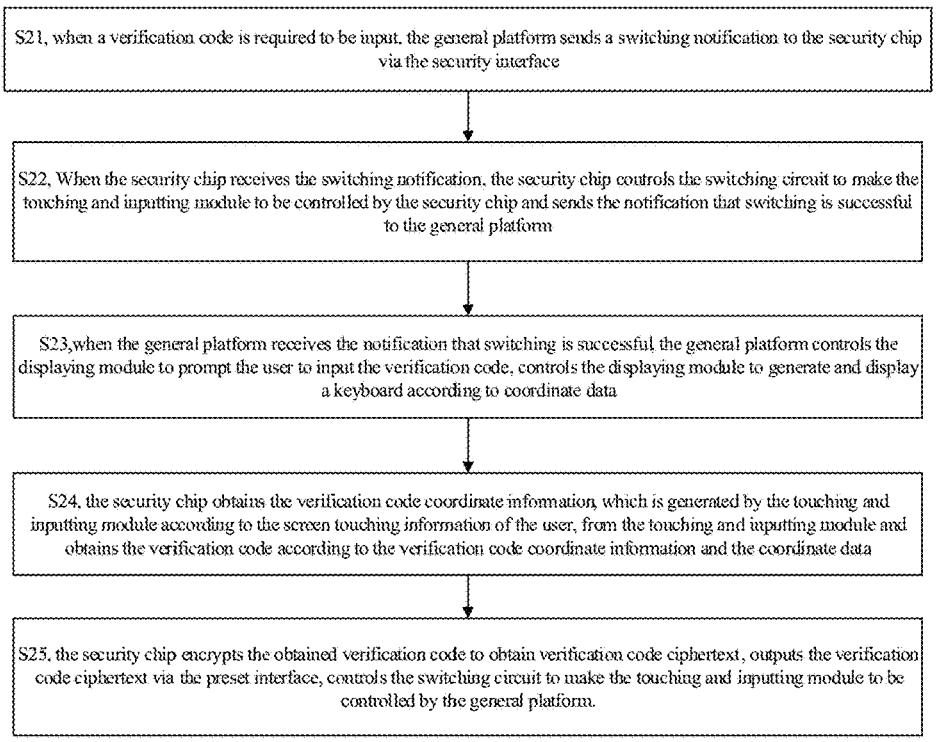
FIG. 2 is a flow chart of a method for safe interacting on a general platform in Embodiment 2 of the present disclosure.

As shown in FIG. 2, the method provided by Embodiment 2 includes the following steps:

Step S21, when a verification code is required to be input, the general platform sends a switching notification to the security chip via the security interface;

Step S22, when the security chip receives the switching notification, the security chip controls the switching circuit to make the touching and inputting module controlled by the security chip and sends the notification that switching is successful to the general platform;

Step S23, when the general platform receives the notification that switching is successful, the general platform controls the displaying module to prompt the user to input a verification code, controls the displaying module to generate and display a keyboard according to coordinate data;

Step S24, the security chip obtains the verification code coordinate information, which is generated by the touching and inputting module according to the screen touching information of the user, from the touching and inputting module and obtains the verification code according to the verification code coordinate information and the coordinate data; and Step S25, the security chip encrypts the obtained verification code to obtain verification code ciphertext, outputs the verification code ciphertext via a preset interface, controls the switching circuit to make the touching and inputting module controlled by the general platform.

Preferably, after the security chip controls the switching circuit to make the touching and inputting module controlled by the security chip in Step S22 of Embodiment 2, the switching circuit can be used as communication channel between the touching and inputting module and the security chip, meanwhile the switching circuit can be used as communication channel between the displaying module and the general platform; then in Step 23, the general platform controls the displaying module to prompt the user to input a verification code via the communication channel, i.e. the switching circuit, and controls the displaying module to generate and display the keyboard via the communication channel, i.e. the switching circuit, according to the coordinate data; in Step S24, the security chip obtains the verification code coordinate information, which is generated by the touching and inputting module according to the screen touching information of the user, via the communication channel, i.e. the switching circuit.

In Embodiment 2, after the security chip receives the switching notification, the method further includes that the security chip generates a random keyboard value sequence and sends the random keyboard value sequence to the general platform via the security interface.

After the general platform receives the notification that switching is successful, the method further includes that the general platform generates random coordinate data according to the received random keyboard value sequence and preset keyboard coordinates.

That the general platform generates and displays the keyboard according to the coordinate data specifically is that the general platform controls the displaying module to generate and display a random number keyboard according to the random coordinate data.

After the general platform generates and displays the keyboard according to the coordinate data, the method further includes that the general platform sends the random coordinate data to the security chip via the security interface.

In Step S24, that the security chip obtains the verification code according to the verification code coordinate information and the coordinate data specifically includes that the security chip obtains the verification code according to the verification code coordinate information and the random coordinate data.

Specifically, that the security chip generates the random keyboard value sequence can refer to Steps M11-M14 of Embodiment 1, which is not be reiterated here.

Or, in Embodiment 2, after the general platform receives notification of successful switching, the method further includes that the general platform generates the random keyboard value sequence and generates the random coordinate data according to the random keyboard value sequence and the preset keyboard coordinates.

Correspondingly, that the general platform controls the displaying module to generate and display the keyboard according to the coordinate data includes that the general platform controls the displaying module to generate and display the random number keyboard according to the random coordinate data.

After the general platform generates and displays the keyboard according to the coordinate data, the method further includes that the general platform sends the random coordinate data to the security chip.

In Step S24, that the security chip obtains the verification code according to the verification code coordinate information and the coordinate data includes that the security chip obtains the verification code according to the verification code coordinate information and the random coordinate data.

Specifically, that the general platform generates the random keyboard value sequence includes the following steps:

Step L11, the general platform obtains a preset keyboard value sequence, sets a maximum keyboard value of the preset keyboard value sequence to be an initial value of the first index value, sets a minimum keyboard value of the preset keyboard value sequence to the initial value of the second index value, takes the obtained preset keyboard value sequence as a current preset keyboard value sequence, takes the initial value of the first index value as a current first index value and takes the initial value of the second index value as a current second index value;

Step L12, the general platform invokes a random number generating function to generate a random number with one byte, performs bitwise AND operation on the generated random number and the current first index value to obtain a bitwise AND operation result;

Step L13, the general platform finds the keyboard value corresponding to the position of the bitwise AND operation result from the current preset keyboard sequence value, takes the found keyboard value as the keyboard value corresponding to the position of the current second index value in the random keyboard value to obtain the current random keyboard value sequence; and Step L14, the general platform removes the keyboard value corresponding to the position of the bitwise AND operation result in the preset keyboard value sequence, uses the keyboard value, which is behind the removed keyboard value in the current preset keyboard value sequence, to refill the position of the removed keyboard value, takes the sequence obtained by refilling as the current preset keyboard value sequence, updates the current first index value and the current second index value, determines whether the updated first current index value and the current second index value is beyond the number of keyboard values of the preset keyboard value sequence, if yes, take the current random keyboard value sequence as a final random keyboard value sequence; otherwise, go back to Step L12.

Correspondingly, that the general platform generates random coordinate data according to the random keyboard value sequence and the preset keyboard coordinates includes that the general platform assigns the random keyboard value sequence to the value of the preset keyboard coordinates to generate the random coordinate data.

In Embodiment 2, before the verification code is required to be input, the method further includes that the general platform obtains transaction information.

Correspondingly, when the general platform controls the displaying module to prompt the user to input the verification code, the method further includes that the general platform controls the displaying module to display transaction amount according to the transaction information.

Or, in Embodiment 2, before requiring inputting the verification code, the method further includes:

Step C1, when transaction amount is required to be input, the general platform sends switching notification to the security chip via the security interface;

Step C2, when the security chip receives the switching notification, the security chip controls the switching circuit to make the touching and inputting module controlled by the security chip and sends a notification of successful switching to the general platform;

Step C3, when the general platform receives the notification of successful switching, the general platform controls the displaying module to generate and display a keyboard and controls the displaying module to prompt the user to input the transaction amount;

Step C4, the security chip obtains the transaction data coordinate information, which is generated by the touching and inputting module according to the screen touching information of the user, from the touching and inputting module and obtains the transaction data according to the transaction data coordinate information; and Step C5, the security chip sends the transaction data to the general platform via the security interface, controls the switching circuit controlled by the touching and inputting module and the displaying module.

Correspondingly, when the general platform controls the displaying module to prompt the user to input the verification code, the method further includes that the general platform controls the displaying module to display the transaction amount according to the transaction data.

In Embodiment 2, Step S24 specifically includes:

when the touching and inputting module receives the touching information input by the user time every time, the touching and inputting module generates verification code coordinate information according to the screen touching information, uses the generated verification code coordinate information to update the data in its register and sends interruption notification to the security chip.

Step S241, when the security chip receives the interruption notification of the touching and inputting module, the security chip reads the verification code coordinate information from the register of the touching and inputting module.

Step S242, the security chip finds a keyboard value corresponding to the read verification code coordinate information from the coordinate information, when the found keyboard value is a number key, the security chip takes the found keyboard value as one digit of the verification code and the found keyboard value to the end of the current verification code sequence to obtain a new verification code sequence, takes the new verification code sequence as the current verification code sequence, sends information of inputting data to the general platform via the security interface and go back to Step S241; when the found keyboard value is backspace key, the security chip sends backspace information to the general platform, go back to Step S241; when the found keyboard value is confirming key, the security chip sends confirming information to the general platform and takes the current verification code sequence as the verification code, execute Step S25.

Step S243, when the general platform receives the information of inputting data, the general platform controls the displaying module to display inputting one digit of data; when the general platform receives the backspace information, the general platform controls the displaying module to display deleting one digit of data; when the general platform receives the confirming information, the general platform controls the displaying module to display information of completing inputting verification code.

In Step S24, when the security chip receives the interruption notification of the touching and inputting module for the first time, the method further includes that the security chip initializes the verification code sequence and takes the initialized verification code sequence as a current verification code sequence.

In Embodiment 2, when the preset interface is a security interface, that the security chip outputs verification code ciphertext via the preset interface includes that the security chip sends the verification code ciphertext to the general platform via the security interface.

When the preset interface is a financial IC card interface, that the security chip outputs the verification code ciphertext via the preset interface includes that the security chip sends the verification code ciphertext to the financial IC card via the financial IC card interface.

In Embodiment 2, after Step S25, the method further includes:

Step C11, when transaction amount is required to be input, the general platform sends a switching notification to the security chip via the security interface;

Step C12, when the security chip receives the switching notification, the security chip controls the touching and inputting module controlled by the security chip and sends the notification of successful switching to the general platform;

Step C13, when the general platform receives the notification of successful switching, the general platform controls the displaying module to generate and display a keyboard and controls the displaying module to prompt the user to input the transaction amount;

Step C14, the security chip obtains the transaction data coordinate information, which is generated by the touching and inputting module according to the touching information of the user, from the touching and inputting module, and obtains transaction data according to the transaction data coordinate information; and Step C15, the security chip sends the transaction data to the general platform via the security interface and controls the switching circuit to make the touching and the inputting module and the displaying module controlled by the general platform.

In Embodiment 2, the security chip can encrypt the transaction data after obtaining the transaction data; correspondingly, that the security chip sends the transaction data to the general platform via the security interface includes that the security chip sends the encrypted transaction data to the general platform via the security interface.

As advantages of Embodiment 2, before a user inputs the verification code and the transaction amount, the security chip makes the touching and inputting module controlled by the security chip; therefore, even if any loop exists at the platform, the verification code input by the user cannot be stolen and the transaction amount input by the user cannot be tampered, which guarantees security in process of inputting the verification code and the transaction amount, and avoids the loss caused by verification code leaking and transaction amount tampering.

Embodiment 3

Embodiment 3 provides a method for safe interacting on a general platform, and the method is applied to a smart terminal including the general platform, a security chip, a switching circuit, a touching and inputting module and a displaying module; the general platform is connected to the security chip via a security interface, and the general platform and the security chip are connected to the displaying module via the switching circuit, the touching and inputting module is connected to the general platform.

Figure 3:
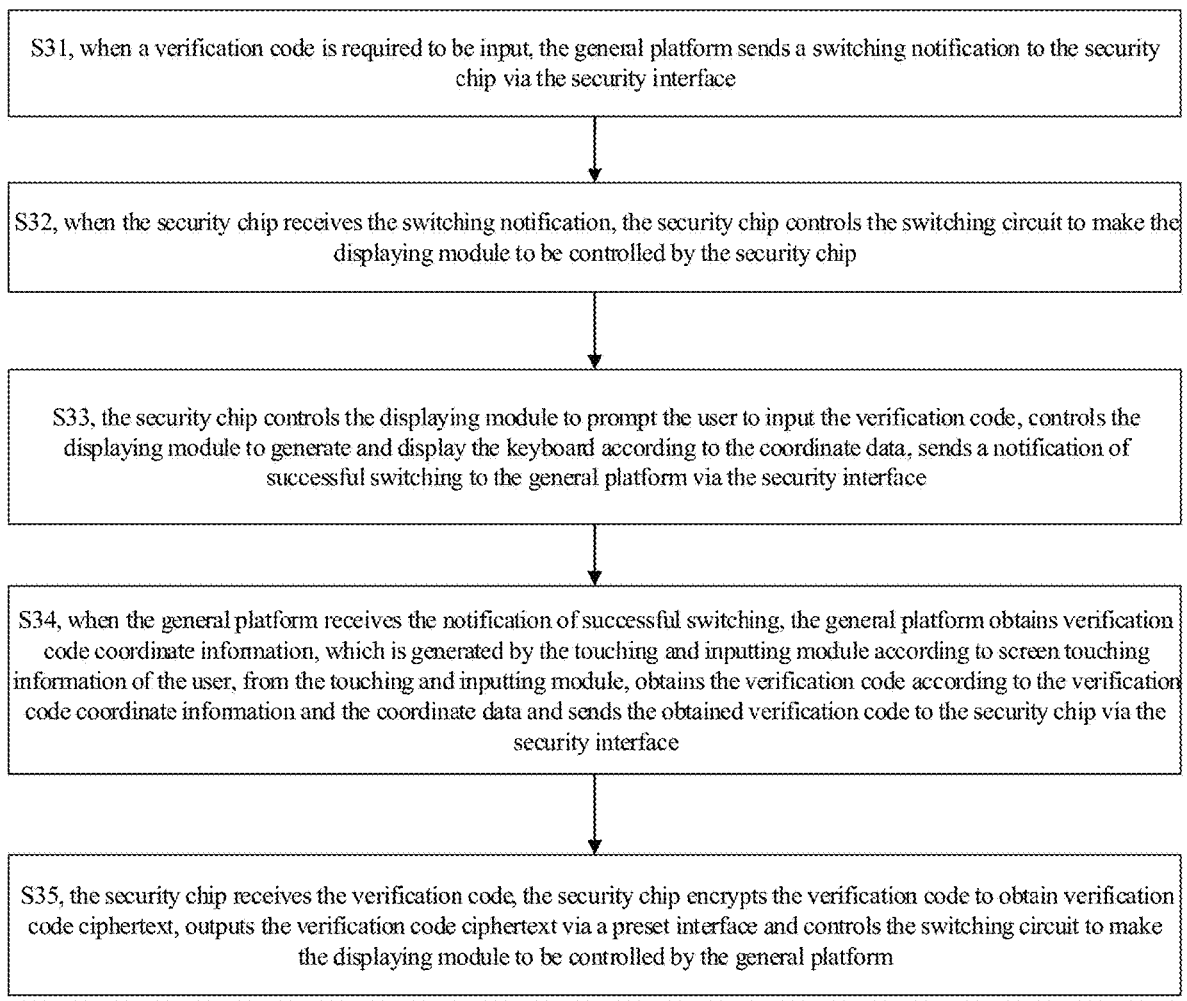
FIG. 3 is a flow chart of a method for safe interacting on a general platform in Embodiment 3 of the present disclosure.
Figure 4:
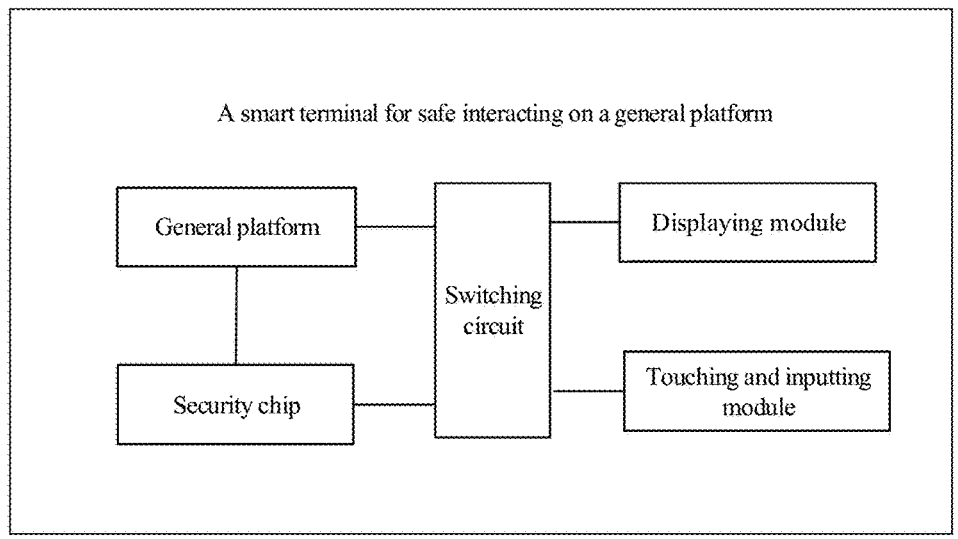
FIG. 4 is a diagram of a smart terminal for safe interacting on a general platform in Embodiment 4 of the present disclosure.

As shown in FIG. 3, the method provided by Embodiment 3 includes the following steps:

Step S31, when a verification code is required to be input, the general platform sends a switching notification to the security chip via the security interface;

Step S32, when the security chip receives the switching notification, the security chip controls the switching circuit to make the displaying module controlled by the security chip;

Step S33, the security chip controls the displaying module to prompt a user to input a verification code, controls the displaying module to generate and display a keyboard according to coordinate data, and sends a notification of successful switching to the general platform via the security interface;

Step S34, when the general platform receives the notification of successful switching, the general platform obtains verification code coordinate information, which is generated by the touching and inputting module according to screen touching information of the user, from the touching and inputting module, obtains the verification code according to the verification code coordinate information and the coordinate data, and sends the obtained verification code to the security chip via the security interface; and Step S35, the security chip receives the verification code, the security chip encrypts the verification code to obtain verification code ciphertext, outputs the verification code ciphertext via a preset interface and controls the switching circuit to make the displaying module controlled by the general platform.

Preferably, in Step 32 of Embodiment 3, after the security chip controls the switching circuit to make the displaying module controlled by the security chip, the switching circuit can be used as communicating channel between the displaying module and the security chip; meanwhile the switching circuit can be uses as communicating channel between the touching and inputting module and the general platform; that is, in Step S33, the security chip controls the displaying module to prompt the user to input a verification code via the switching circuit, i.e. the communicating channel, and controls the displaying module to generate and display the keyboard via the switching circuit, i.e. the communicating channel according to the coordinate data; in Step S34, the general platform obtains the verification code coordinate information, which is generated by the touching and inputting module according to screen touching information of the user, from the touching and inputting module via the switching circuit, i.e. the communicating channel In Embodiment 3, when the verification code is required to be input, the method further includes:

Step E1, when the transaction amount is required to be input, the general platform sends the switching notification to the security chip via the security interface;

Step E2, when the security chip receives the switching notification, the security chip controls the switching circuit to make the displaying module controlled by the security chip, and sends a successful switching notification to the general platform via the security chip;

Step E3, the security chip controls the displaying module to generate and display the keyboard, and controls the displaying module to prompt the user to input the transaction amount; and Step E4, when the general platform receives the notification of successful switching, the general platform obtains the transaction data coordinate information, which is generated by the touching and inputting module according to the screen touching information of the user, from the touching and inputting module, and obtains the transaction data according to the transaction data coordinate information.

Correspondingly, Step S31 further includes: the general platform sends the transaction data to the security chip via the security interface; and when the security chip controls the displaying module to prompt the user to input the verification code, the method further includes that the security chip controls the displaying module to display transaction amount according to the transaction data.

In Embodiment 3, when the preset interface is security interface, that the security chip outputs the verification code ciphertext via the preset interface specifically includes that the security chip sends the verification code ciphertext to the general platform via the security interface.

When the preset interface is financial IC card interface, that the security chip outputs the verification code ciphertext via the preset interface includes that the security chip sends the verification code ciphertext to the financial card via the financial IC card interface.

Specifically, Step S34 specifically includes that when the touching and inputting module receives the screen touching information input by the user, the touching and inputting module generates verification code coordinate information according to the screen touching information, uses the generated verification code coordinate information to update data of the register of the touching and input module, and sends an interruption notification to the general platform.

Step S341, when the general platform receives the interruption notification of the touching and inputting module, the general platform reads the verification code coordinate information from the register of the touching and inputting module.

Step S342, the general platform finds the keyboard value, which corresponds to the read verification code coordinate information, from the coordinate data, when the found keyboard value is number key, adds the found keyboard value, which is taken as one digit of the verification code, to the end of the current verification code sequence to obtain a new verification code sequence, takes the new verification code sequence as a current verification code sequence and controls the displaying module to display inputting one digit of data, go back to Step S341; when the found keyboard value is backspace key, the general platform controls the displaying module to display deleting one digit of data, go back to Step S341; and when the found keyboard value is confirming key, the general platform controls the displaying module to display information that inputting verification code is completed and takes the current verification code sequence as verification code, execute Step S35.

That the general platform receives the interruption notification of the touching and inputting module for the first time in Step S34 further includes that the general platform initializes the verification code sequence, and takes the initialized verification code sequence as the current verification code sequence.

In Embodiment 3, after Step S35, the method further includes:

Step E11, when transaction amount is required to be input, the general platform sends the switching notification to the security chip via the security interface;

Step E12, when the security chip receives the switching notification, the security chip controls the switching circuit to make the displaying module controlled by the security chip, and sends a notification of successful switching to the general platform via the security interface;

Step E13, the security chip controls the displaying module to generate and display the keyboard, controls the displaying module to prompt the user to input the transaction amount, and sends the notification of successful switching to the general platform via the security interface; and Step E14, when the general platform receives the notification of successful switching, the general platform obtains the transaction data coordinate information, which is generated by the touching and inputting module according to the screen touching information of the user, from the touching and inputting module and obtains the transaction amount data according to the transaction data coordinate information.

The advantages of Embodiment 3 are such that before entering the verification code and the transaction amount input by the user, the security chip makes the displaying module controlled by the security chip; in this case, even if any loop exists on the platform, the verification code input by the user cannot be stolen and the transaction amount input by the user cannot be tampered, which guarantees security in process of inputting the verification code and the transaction amount, and avoids the loss caused by possible verification code leaking and transaction amount tampering.

Embodiment 4

Embodiment 4 provides a method for safe interacting on a general platform, and the method is applied to a smart terminal including the general platform, a security chip, a switching circuit, a touching and inputting module and a displaying module; the general platform is connected to the security chip via a security interface, and the general platform and the security chip are connected to the touching and inputting module and the displaying module via the switching circuit.

Figure 5:
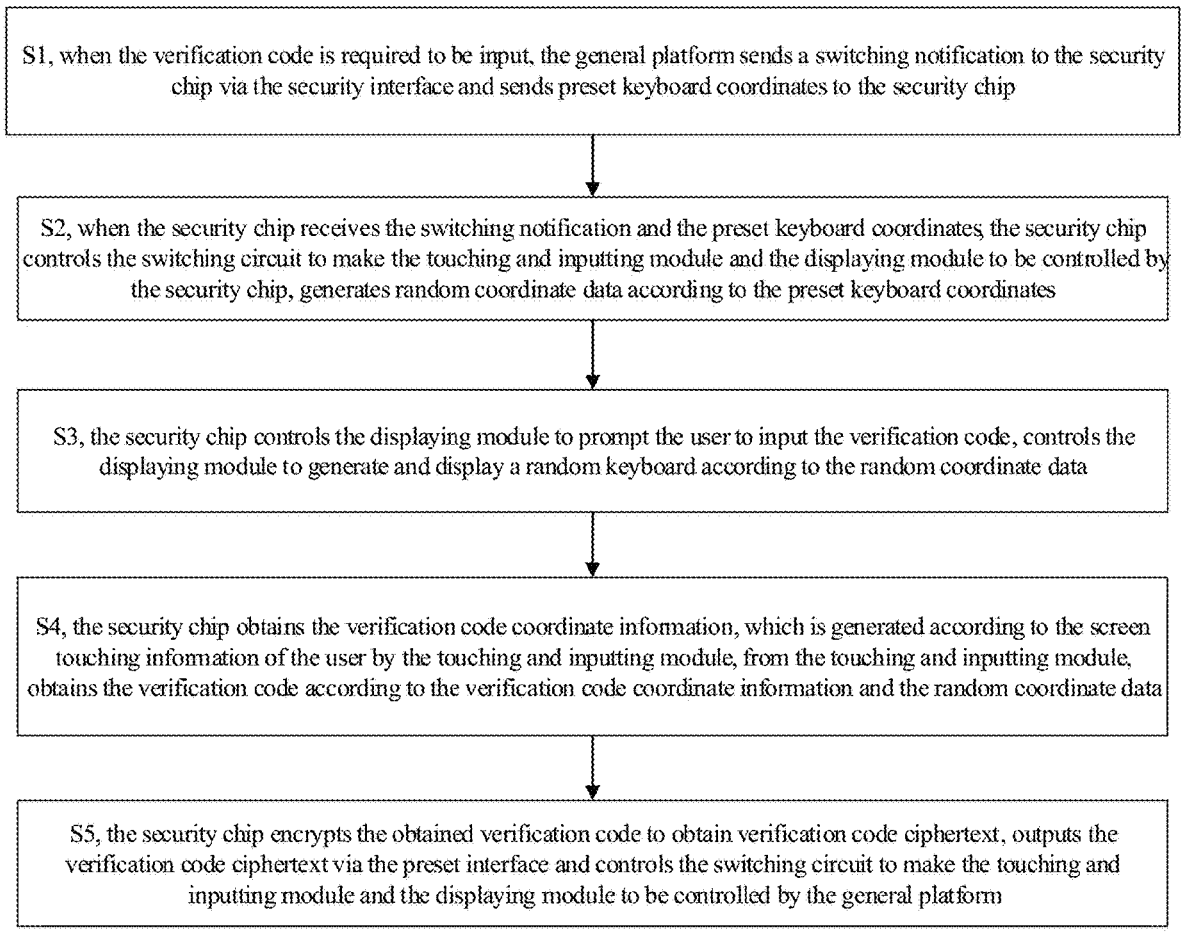
FIG. 5 is a flow chart of a method for safe interacting on a general platform in Embodiment 4 of the present disclosure.

As shown in FIG. 5, Embodiment 4 provides a method which specifically includes the following steps:

Step S1, when the verification code is required to be input, the general platform sends a switching notification to the security chip via the security interface, and sends preset keyboard coordinates to the security chip.

Specifically, the preset keyboard coordinates specifically are scope of the preset keyboard coordinate values. For example, the preset keyboard coordinates are as follows.

| | | |
|---|---|---|
| 0 × 00-0 × 04, | 0 × 04-0 × 08, | 0 × 08-0 × 12, |
| 0 × 00-0 × 04 | 0 × 00-0 × 04 | 0 × 00-0 × 04 |
| 0 × 00-0 × 04, | 0 × 04-0 × 08, | 0 × 08-0 × 12, |
| 0 × 04-0 × 08 | 0 × 04-0 × 08 | 0 × 04-0 × 08 |
| 0 × 00-0 × 04, | 0 × 04-0 × 08, | 0 × 08-0 × 12, |
| 0 × 08-0 × 12 | 0 × 08-0 × 12 | 0 × 08-0 × 12 |
| 0 × 00-0 × 04, | 0 × 04-0 × 08, | 0 × 08-0 × 12, |
| 0 × 12-0 × 16 | 0 × 12-0 × 16 | 0 × 12-0 × 16 |

Step S2, when the security chip receives the switching notification and the preset keyboard coordinates, the security chip controls the switching circuit to make the touching and inputting module and the displaying module controlled by the security chip, and generates random coordinate data according to the preset keyboard coordinates.

Step S3, the security chip controls the displaying module to prompt the user to input the verification code, controls the displaying module to generate and display a random keyboard according to the random coordinate data.

Step S4, the security chip obtains the verification code coordinate information, which is generated by the touching and inputting module according to the screen touching information of the user, from the touching and inputting module, and obtains the verification code according to the verification code coordinate information and the random coordinate data.

Step S5, the security chip encrypts the obtained verification code to obtain verification code ciphertext, outputs the verification code ciphertext via a preset interface and controls the switching circuit to make the touching and inputting module and the displaying module controlled by the general platform.

In Step S5 of Embodiment 4, when the preset interface is security interface, that the security chip outputs the verification code ciphertext via the preset interface specifically includes that the security chip sends the verification code ciphertext to the general platform via the security interface; when the preset interface is financial IC card interface, that the security chip outputs the verification code ciphertext via the preset interface specifically is that the security chip sends the verification code ciphertext to the financial IC card via the financial IC card interface.

In the present invention, that the security chip connects to the general platform via security interface specifically is that the general platform connects to security chip via hardware pin, the general platform invokes an interface function corresponding to the security interface to send data to the security chip via the hardware pin, receives data returned by the security chip via the hardware pin. Using the security interface to transferring data between the security chip and the general platform can guarantee security of data.

In Embodiment 4, Steps S1 to Step S2 can be replaced, respectively, with the following steps: when the verification code is required to be input, the general platform sends a switching notification to the security chip via the security interface; and when the security chip receives switching notification, the security chip controls the switching circuit to make the touching and inputting module and the displaying module controlled by the security chip, and generates random coordinate data according to the preset keyboard coordinate data.

Specifically, in Embodiment 4, a control pin of the security chip is connected to the control end of the switching circuit, a first input end and a second input end of the switching circuit are connected to the touching and inputting module and the displaying module, and a second output end of the switching circuit is connected to a communicating pin of the general platform.

That the security chip controls the switching circuit to make the touching and inputting module and the displaying module controlled by the security chip specifically is that the security chip inputs high-level signal to the control end of the switching circuit via the control pin of the security chip; when the control end of the switching circuit receives the high-level signal, the switching circuit controls its first input end and its second input end to connect the first output end.

Correspondingly, that the security chip controls the switching circuit to make the touching and inputting module and the displaying module be controlled by the general platform specifically is that the security chip inputs low-level signal; when the control end of the switching circuit receives the low level signal, the switching circuit controls its first input end and its second input end and the second output end to be conductive.

Specifically, that the security chip generates random coordinate data according to the preset keyboard coordinates includes that the security chip generates a random keyboard value sequence, generates random coordinate data according to the random keyboard value sequence and preset keyboard coordinates.

Specifically, that the security chip generates the random keyboard value sequence includes the following steps:

Step W11, the security chip obtains a preset keyboard value sequence, uses the maximum keyboard value in the preset keyboard value sequence to set an initial value of a first index value, uses the minimum keyboard value in the preset keyboard value sequence to set an initial value of a second index value, takes the obtained preset keyboard value sequence as a current keyboard value sequence, takes the initial value of the first index value as a current first index value, and takes the initial value of the second index value as a current second index value.

For example, the security chip obtains the preset keyboard value sequence 0x00, 0x01, 0x02, 0x03, 0x04, 0x05, 0x06, 0x07, 0x08, 0x09, sets the maximum keyboard value 9 of the preset keyboard value sequence to be the initial value of the first index value, sets the minimum keyboard value 0 of the preset keyboard value sequence to be the initial value of the second index value.

In the present invention, the preset keyboard value sequence can be a keyboard value sequence of which the keyboard values ranged from 0 to 9. For example, the preset keyboard value sequence can be 0x01, 0x08, 0x00, 0x02, 0x04, 0x03, 0x06, 0x05, 0x07, 0x09; or the preset keyboard value sequence can be 0x08, 0x04, 0x03, 0x01, 0x09, 0x00, 0x02, 0x06, 0x05, 0x07. In Embodiment 4, for example, the preset keyboard value sequence is 0x00, 0x01, 0x02, 0x03, 0x04, 0x05, 0x06, 0x07, 0x08, 0x09.

Step W12, the security chip invokes a random number generating function to generate a random number with one byte, performs bitwise AND operation on the generated random number and the current first index value to obtain a bitwise AND operation result.

In Embodiment 4, that the security chip invokes the random number function to generate a random number with one byte includes that the security chip invokes the random number function hwGenRand(&rnd, 1) to generate a random number with one byte via an application for generating random number or a real random source.

For example, the security chip invokes the random number generating function to generate a random number with one byte which is 0x29; when the current first index value is 9, the security chip performs bitwise AND operation on the generated random number 0x29 and 9 to obtain a bitwise AND operation result, i.e. 0x01.

Step W13, the security chip finds a keyboard value corresponding to the position of the bitwise AND operation result from the current preset keyboard sequence, takes the found keyboard value as the keyboard value which corresponds to the position of the current second index value in the random keyboard value sequence to obtain the current random keyboard value sequence.

For example, the security chip finds a keyboard value, i.e. 0x01, corresponding to the position of the bitwise AND operation result, i.e. 0x01, from the current preset keyboard sequence, i.e. 0x00, 0x01, 0x02, 0x03, 0x04, 0x05, 0x06, 0x07, 0x08, 0x09, takes the found keyboard value, i.e. 0x01, as the keyboard value i.e. 0x01, which corresponds to the position of the current second index value, i.e. 0, in the random keyboard value sequence to obtain the current random keyboard value sequence, i.e. 0x01.

Step W14, the security chip removes the keyboard value, which is corresponding to the position of the bitwise AND operation result, in the current preset keyboard value sequence, refills the position of the removed keyboard value by using the keyboard value behind the removed keyboard value in the current preset keyboard value sequence, takes the keyboard sequence obtained after refilling as the current preset keyboard value sequence, updates the current first index value and the current second keyboard value, determines whether the updated current first index value and the updated current second index value overpasses number of the keyboard values of the preset keyboard value sequence, if yes, take the current random keyboard value sequence as a final random keyboard value sequence; otherwise, go back to Step W12.

Specifically, that the security chip updates the current first index value specifically includes that the security chip deduct 1 from the current first index value to obtain an updated current first index value; that the security chip updates the current second index value specifically includes that the security chip adds 1 to the current first index value to obtain an updated current second index value.

For example, the security chip removes the keyboard value, i.e. 0x01, which corresponds to the position of the operating result, i.e. 0x01, in the current preset keyboard value sequence, i.e. 0x00, 0x01, 0x02, 0x03, 0x04, 0x05, 0x06, 0x07, 0x08, 0x09, refills the position of the removed keyboard value by using the keyboard value, i.e. 0x09, behind the removed keyboard value in the current preset keyboard value sequence, takes the keyboard sequence, i.e. 0x00, 0x09, 0x02, 0x03, 0x04, 0x05, 0x06, 0x07, 0x08, obtained after refilling as the current preset keyboard value sequence, updates the current first index value and the current second keyboard value to obtain the updated current first index value, i.e. 8, and the updated current second index value, i.e. 1, determines that the updated current first index value, i.e. 8, and the updated current second index value, i.e. 1, do not overpass the number of the keyboard values of the preset keyboard value sequence, go back to Step W12.

For example, the final random keyboard value sequence is: 0x01, 0x09, 0x00, 0x08, 0x06, 0x07, 0x02, 0x03, 0x04, 0x05.

In Embodiment 4, that the security chip generates random coordinate data according to the random keyboard value sequence and the preset keyboard coordinates includes that the security chip generates random coordinate data according to the random keyboard value sequence, a preset keyboard value of the backspace key, a preset keyboard value of the confirming key and the preset keyboard coordinates.

For example, according to the random keyboard value sequence, i.e. 0x01, 0x09, 0x00, 0x08, 0x06, 0x07, 0x02, 0x03, 0x04, 0x05, the preset keyboard value, i.e. 0x0A, of the backspace key, the preset keyboard value, i.e. 0x0B, of the confirming key, and the preset keyboard coordinates as follows,

| | | |
|---|---|---|
| 0 × 00-0 × 04, 0 × 00-0 × 04 | 0 × 04-0 × 08, 0 × 00-0 × 04 | 0 × 08-0 × 12, 0 × 00-0 × 04 |
| 0 × 00-0 × 04, 0 × 04-0 × 08 | 0 × 04-0 × 08, 0 × 04-0 × 08 | 0 × 08-0 × 12, 0 × 04-0 × 08 |
| 0 × 00-0 × 04, 0 × 08-0 × 12 | 0 × 04-0 × 08, 0 × 08-0 × 12 | 0 × 08-0 × 12, 0 × 08-0 × 12 |
| 0 × 00-0 × 04, 0 × 12-0 × 16 | 0 × 04-0 × 08, 0 × 12-0 × 16 | 0 × 08-0 × 12, 0 × 12-0 × 16 | the security chip generates the random coordinate data, which are as follows:

| | | |
|---|---|---|
| 0 × 01, 0 × 00-0 × 04, 0 × 00-0 × 04 | 0 × 09, 0 × 04-0 × 08, 0 × 00-0 × 04 | 0 × 00, 0 × 08-0 × 12, 0 × 00-0 × 04 |
| 0 × 08, 0 × 00-0 × 04, 0 × 04-0 × 08 | 0 × 06, 0 × 04-0 × 08, 0 × 04-0 × 08 | 0 × 07, 0 × 08-0 × 12, 0 × 04-0 × 08 |
| 0 × 02, 0 × 00-0 × 04, 0 × 08-0 × 12 | 0 × 03, 0 × 04-0 × 08, 0 × 08-0 × 12 | 0 × 04, 0 × 08-0 × 12, 0 × 08-0 × 12 |
| 0 × 05, 0 × 00-0 × 04, 0 × 12-0 × 16 | 0 × 0A, 0 × 04-0 × 08, 0 × 12-0 × 16 | 0 × 0B, 0 × 08-0 × 12, 0 × 12-0 × 16 |

For example, the security chip controls the displaying module to prompt the user to input the verification code, and controls the displaying module to generate and display the random number keyboard as the following table according to the random coordinate data.

| Input verification code please | | |
|---|---|---|
| 1 | 9 | 0 |
| 8 | 6 | 7 |
| 2 | 3 | 4 |
| 5 | X | Ok |

In Embodiment 4, Step S4 specifically includes that when the touching and inputting module receives screen touching information input by the user every time, the touching and inputting module generates verification code coordinate information according to the screen touching information, updates the data in its register by using the generated verification code coordinate information and sends an interruption notification to the security chip.

For example, when the touching and inputting module receives the screen touching information input by the user, the touching and inputting module generates verification code coordinate information, i.e. 0x01, 0x01, according to the screen touching information, uses the verification code coordinate information, i.e. 0x01, 0x01, to update the data in its register.

Step S41, when the security chip receives the interruption notification of the touching and inputting module, the security chip reads the verification code coordinate information from the register of the touching and inputting module.

For example, when the security chip receives the interruption notification, the security chip reads the verification code coordinate information, i.e. 0x01, 0x01, from the register of the touching and inputting module.

Step S42, the security chip finds the keyboard value, which corresponds to the read verification code information, from the random coordinate data; when the found keyboard value is number key, the security chip adds the found keyboard value, which is taken as one digit of the verification code, to the end of the current verification code sequence to obtain a new verification code sequence, takes the new verification code sequence as the current verification code sequence, controls the displaying module to display inputting one digit of data, then going back to Step S41; when the found keyboard value is backspace key, the security chip controls the displaying module to display deleting one digit of data, then going back to Step S41; and when the found keyboard value is confirming key, controls the displaying module to display information that inputting verification code is completed, and takes the current verification code sequence as verification code, then going back to Step S5.

In Step S4, that the security chip receives the interruption notification from the touching and inputting module for the first time further includes that the security chip initializes the verification code sequence and takes the verification code sequence after initializing as a current verification code sequence.

In Embodiment 4, the keyboard values of the number key are ranged from 0x00 to 0x09; the keyboard value of the backspace key is 0x0A; the keyboard value of the confirming key is 0x0B.

For example, when the verification code coordinate information read by the security chip from the register of the touching and inputting module is 0x01, 0x01, from the following random coordinate data

| | | |
|---|---|---|
| 0 × 01, 0 × 00-0 × 04, 0 × 00-0 × 04 | 0 × 09, 0 × 04-0 × 08, 0 × 00-0 × 04 | 0 × 00, 0 × 08-0 × 12, 0 × 00-0 × 04 |
| 0 × 08, 0 × 00-0 × 04, 0 × 04-0 × 08 | 0 × 06, 0 × 04-0 × 08, 0 × 04-0 × 08 | 0 × 07, 0 × 08-0 × 12, 0 × 04-0 × 08 |
| 0 × 02, 0 × 00-0 × 04, 0 × 08-0 × 12 | 0 × 03, 0 × 04-0 × 08, 0 × 08-0 × 12 | 0 × 04, 0 × 08-0 × 12, 0 × 08-0 × 12 |
| 0 × 05, 0 × 00-0 × 04, 0 × 12-0 × 16 | 0 × 0A, 0 × 04-0 × 08, 0 × 12-0 × 16 | 0 × 0B, 0 × 08-0 × 12, 0 × 12-0 × 16 | the security chip finds the keyboard value 0x01 corresponding to the read verification code coordinate information 0x01, 0x01, takes the found key value 0x01 as the number key, adds the found keyboard value, i.e. 0x01, which is taken as one digit of the verification code, to the end of the current verification code sequence to obtain a new verification code sequence, i.e. 1, takes the new verification code sequence as the current verification code sequence, controls the displaying module to prompt inputting one digit of data, then going back to Step S41.

Specifically, that the security chip finds the keyboard value 0x01, which corresponds to the read verification code information, i.e. 0x01, 0x01, from the random coordinate data specifically includes that the security chip finds that the scope of coordinate value corresponding to the read verification code coordinate information, i.e. 0x01, 0x01, from the random coordinate data is 0x00-0x04, 0x00-0x04, finds the keyboard value 0x01 which corresponds to the scope of the coordinate value 0x00-0x04, x00-0x04.

When the verification code coordinate information read from the register of the touching and inputting module by the security chip is 0x05, 0x14, the found keyboard value is the keyboard value of the backspace key, i.e. 0x0A, the security chip controls the displaying module to prompt deleting one digit of data, then going back to Step S41.

Specifically, when the verification code coordinate information read from the register of the touching and inputting module by the security chip is 0x05, 0x14, that the found keyboard value is the keyboard value of the backspace key, i.e. 0x0A includes: when the verification code coordinate information read from the register of the touching and inputting module by the security chip, the found coordinate value scope corresponding to 0x05, 0x14 is 0x04-0x08, 0x12-0x16; the found keyboard value corresponding to the coordinate value scope, i.e. 0x04-0x08, 0x12-0x16 is the keyboard value of the backspace key, i.e. 0x0A.

When the verification code coordinate information read from the register of the touching and inputting module by the security chip is 0x09, 0x15, the found keyboard value is the keyboard value 0x0B of the confirming key, the security chip controls the displaying module to display information of completing inputting the verification code and takes the current verification code sequence 123456 as the verification code, then execute Step S5. When the verification code obtained by the security chip is 123456, in Step S5 the security chip encrypts the obtained verification code 123456 to obtain the verification code ciphertext D3 7C F6 B3 1A B9 67 55; further, when the verification code obtained by the security chip is 123456, the security chip fills the obtained verification code 123456 and obtains the verification code data after filing, uses a preset key to encrypt the filled verification code data according to a preset algorithm, for example, 3DES algorithm, to obtain the verification code ciphertext, i.e. D3 7C F6 B3 1A B9 67 55.

Specifically, that when the verification code coordinate information read from the register of the touching and inputting module by the security chip is 0x09, 0x15, the found keyboard value is keyboard value 0x0B of the confirming key specifically includes that when the verification code coordinate information read from the register of the touching and inputting module by the security chip is 0x09, 0x15, the coordinate value scope corresponding to 0x05, 0x14 is found to be 0x08-0x12,0x12-0x16, and the keyboard value corresponding to the coordinate value scope 0x08-0x12, 0x12-0x16 is found to be the keyboard value 0x0B of the confirming key.

Preferably, before the security chip obtains the verification code, the security chip executes the following operation: determining whether time between the time when the security chip controls the switching circuit makes the touching and inputting module controlled by the security chip and current time overpasses a preset time, if yes, sending information of timeout to the general platform; otherwise, keeping on determining. For example, the preset time is 3 seconds.

In Embodiment 4, that the security chip controls the displaying module to prompt the user to input verification code specifically includes that the security chip controls the displaying module to display an inputting box and prompts the user to input a verification code.

Correspondingly, after the security chip controls the displaying module to prompt the user to input the verification code and before the security chip controls the displaying module to generate and display a random number keyboard according to the random number coordinate data, the method further includes that when the security chip receives an interruption notification from the touching and inputting module, the security chip obtains the coordinate information form the register of the touching and inputting module, when the security chip determines that the coordinate information is coordinate value of the inputting box, the security chip controls the displaying module to generate, and display the random number keyboard according to the random coordinate data.

In Embodiment 4, the security chip controls the displaying module to display the input box and prompts the user to input the verification code, and controls the displaying module to generate and display the random number keyboard according to the random coordinate data. The random number keyboard is as follows:

| Input the verification code please | | |
|---|---|---|
| 1 | 9 | 0 |
| 8 | 6 | 7 |
| 2 | 3 | 4 |
| 5 | X | Ok |

When the verification code is input, the following is displayed:

| | | |
|---|---|---|
| | *** | |
| 1 | 9 | 0 |
| 8 | 6 | 7 |
| 2 | 3 | 4 |
| 5 | X | Ok |

Or, the security chip controls the displaying module to display the input box and prompts the user to input the verification code, and controls the displaying module to generate and display a random number keyboard according to the random coordinate data. The random number keyboard is as follows:

| | | |
|---|---|---|
| 1 | 9 | 0 |
| 8 | 6 | 7 |
| 2 | 3 | 4 |
| 5 | X | Ok |

When the verification code is input, the following is displayed:

| | | |
|---|---|---|
| * | * | * |
| 1 | 9 | 0 |
| 8 | 6 | 7 |
| 2 | 3 | 4 |
| 5 | X | Ok |

In Embodiment 4, that when the verification code is required to be input, the general platform sends the switching notification to the security chip via the security interface specifically includes that when the general platform receives a request for obtaining verification code from an upper host, i.e. the verification code is required to be input, the general platform sends the switching notification and the request for obtaining verification code to the security chip.

Correspondingly, in Step S5, when the general platform receives the verification code ciphertext, the method further includes that the general platform returns the verification code ciphertext to the upper host. In this case, when the upper host receives the verification code ciphertext, the upper host decrypts the verification code ciphertext to obtain the verification code, determines whether the verification code obtained by decrypting is identical to the verification code stored by the general platform, if yes, verifying is successful; otherwise, verifying is not successful.

A logon system is taken as an example for illustration. The smart terminal can be mobile terminal specifically. The upper host can specifically is an upper layer application of the general platform, the upper layer application sends a request for obtaining verification code to the general platform, when the general platform receives the request for obtaining verification code, the general platform sends a switching notification and the request for obtaining verification code to the security chip; when the general platform receives verification code ciphertext from the security chip, the general platform returns the verification code ciphertext to the upper layer application. When the upper layer application receives the verification code ciphertext, the upper layer application decrypts the verification code ciphertext to obtain the verification code, determines whether the verification code obtained by decrypting is identical to the verification code stored by the upper layer application, if yes, verifying is successful; otherwise, verifying is not successful.

Preferably, in Embodiment 4, before the verification code is required to be input, the method further includes that the general platform obtains transaction information.

When the verification code is required to be input, the method further includes that the general platform sends the transaction information to the security chip.

Correspondingly, Step S3 further includes that the security chip controls the displaying module to display transaction amount according to the transaction information.

For example, a smart POS machine is the smart terminal.

When the smart POS machine executes offline transaction, the general platform scans a pattern, such as a two divisional code or a bar code, to obtain the transaction information or obtains the transaction information input by the user via an inputting module of the smart POS machine or obtains the transaction information from the upper host; after the smart POS machine obtains the transaction information, the smart POS machine executes selecting application, initializing application, reading application data and offline authentication, then the smart POS machine sends a switching notification, transaction information and a request for obtaining verification code; the security chip executes Steps S2-S5 after receiving the switching notification, transaction information and the request for obtaining verification code; in Step S3, the security chip controls the displaying module to display transaction amount according the transaction information; when the security chip sends the verification code ciphertext to the general platform via the security interface in Step S5, after Step S5 the method further includes that the general platform sends the verification code ciphertext to the financial IC card, the financial IC card decrypts the verification code ciphertext to obtain the verification code, determines whether the verification code obtained by decryption is identical to the verification code stored by the financial IC card itself, if yes, verifying is successful and the financial IC card returns information that verifying is successful to the general platform; otherwise, verifying is not successful and the financial IC card sends information that verifying is not successful to the general platform; when the security chip sends the verification code ciphertext to the financial IC card via the financial IC card interface in Step S5, after Step S5 the method further includes that financial IC card decrypts the verification code ciphertext to obtain the verification code, determines whether the verification code obtained by decrypting is identical to the verification stored by the financial IC card itself, if yes, verifying is successful and the financial card sends information that verifying is successful to the security chip; otherwise, verifying is not successful and the financial IC card sends information that verifying is failed to the security chip; the security chip sends information that verifying is successful or verifying is failed to the general platform; preferably, after the general platform receives information that verifying is successful or verifying is failed from the security chip, the general platform processes the information that verifying is successful or verifying is failed. For example, the general platform stores the information that verifying is successful or information that verifying is failed from the security chip; or the general platform generates offline transaction log according to the information that verifying is successful or information that verifying is failed.

When the smart POS machine executes online transaction, the smart POS machine scans a pattern, such as a two dimensional code or a bar code, to obtain transaction information or the general platform obtains the transaction information input by the user via the input module of the POS machine; or the smart POS machine obtains the transaction information sent from the upper host; after the smart POS machine obtains the transaction information, the smart POS machine executes application selecting, application initializing, application data reading and offline authenticating, the smart POS machine sends the switching notification, the transaction information and the requirement of obtaining the verification code; the security chip executes Steps S2-S5 after receiving the switching notification, transaction information and the request for obtaining verification code; and when Step S3 is executed, the security chip further controls the displaying module to display the transaction amount according to the transaction information; when the security chip sends the ciphertext of verification code to the general platform via the security interface in Step S5, after Step S5, after the general platform receives the verification code ciphertext, the method further includes that the general platform organizes online transaction message according to the verification code ciphertext. In this case, when the upper host receives the online transaction message, the upper host obtains the ciphertext of verification code from the online transaction message, decrypts the verification code ciphertext to obtain the verification code, determines whether the verification code obtained by decrypting is identical to the verification stored by the upper host, if yes, verifying is successful and the upper host returns information that verifying is successful to the general platform; otherwise, verifying is not successful and the upper host returns information that verifying is failed to the general platform.

Or, preferably, in Embodiment 4, when requiring inputting the verification code, the method further includes that the general platform sends the request for obtaining verification code to the security chip via the security interface.

Correspondingly, that the security chip controls the displaying module to prompt the user to input the verification code specifically is that the security chip controls the displaying module to prompt the user to input the verification code according to the request for obtaining verification code.

Correspondingly, before requiring input the verification code, the method further includes:

Step A1, when transaction amount is required to be input, the general platform sends the switching notification and the request for obtaining transaction amount to the security chip via the security interface.

For example, the smart POS machine executes transaction. When the smart POS machine receives a transaction requirement from the user or receives a transaction requirement from the upper host, the smart POS machine requires the user to input the transaction amount, the general platform sends the switching notification and the request for obtaining transaction amount to the security chip via the security interface.

Step A2, when the security chip receives the switching notification and the request for obtaining the transaction amount, the security chip controls switching circuit to make the touching and inputting module and the displaying module controlled by the security chip.

In Step A2, the method that the security chip controls the switching circuit to make the touching and inputting module and the displaying module controlled by the security chip in details is the same as that in Embodiment 4; no more reiteration is given here.

Step A3, the security chip controls the displaying module to prompt the user to input the transaction amount according to the request for obtaining transaction amount and controls the displaying module to generate and display the keyboard.

Step A4, the security chip obtains the transaction data coordinate information, which is generated by the touching and inputting module according to the touching information of the user, from the touching and inputting module, obtains the transaction amount data according to the transaction data coordinate information, sends the transaction amount data to the general platform via the security interface, controls the switching circuit to make the touching and inputting module and the displaying module controlled by the general platform.

Correspondingly, Step S3 further includes that the security chip controls the displaying module to display the transaction amount according to the transaction amount data.

In another preferably embodiment, Step A1 further includes that the general platform sends preset keyboard coordinate to the security chip via the security interface; correspondingly, that the security chip controls the displaying module to generate and display the keyboard specifically is that the security chip generates random coordinate data according to the received preset keyboard coordinates, controls the displaying module to generate and display a random number keyboard according to the random coordinate data; that the security chip obtains the transaction amount data according to the transaction data coordinate information specifically is that the security chip obtains the transaction amount data according to the transaction data coordinate information and the random coordinate data.

Specifically, that the security chip generates the random coordinate data according to the received preset keyboard coordinates specifically is that the security chip generates a random keyboard value sequence, generates random coordinate data according to the random keyboard value sequence and the received preset keyboard coordinates; the method that the security chip generates the random keyboard value sequence can refer to Step W11 to Step W14.

Further, specifically, that the security chip generates random coordinate data according to the random keyboard value sequence and the receives the preset keyboard coordinate specifically includes that the security chip generates the random coordinate data according to the random keyboard value sequence, the keyboard value of the preset backspace key and the keyboard value of the preset confirming key and the preset keyboard coordinates.

In another preferred embodiment, that the security chip controls the displaying module to generate and display the keyboard specifically is that the security chip generates the random coordinate data according to the preset keyboard coordinates and controls the displaying module to generate and display a random number keyboard according to the random coordinate data; correspondingly, that the security chip obtains the transaction amount data according to the transaction data coordinate information specifically includes that the security chip obtains the transaction amount data according to the transaction data coordinate information and the random coordinate data.

Specifically, that the security chip generates the random coordinate data according to the preset keyboard coordinates specifically includes that the security chip generates a random keyboard value sequence, generates random coordinate data according to the random keyboard sequence and the preset keyboard coordinates; specifically, that the security chip generates the random keyboard value sequence can refer to Steps W11-W14.

Further, the security chip generates random coordinate data according to the random keyboard value sequence and the preset keyboard coordinate specifically includes that the security chip generates the random keyboard data according to the random keyboard value sequence, the preset keyboard value of the backspace key, the preset keyboard value of the confirming key and the preset keyboard coordinates.

In Embodiment 4, the method that security chip obtains the transaction amount data according to the transaction data coordinate information and the random coordinate data is the same as the method that the security chip obtains the verification code according to the verification code coordinate information and the random coordinate data. No more details are given here.

Preferably, that the security chip controls the displaying module to generate and display the keyboard further can specifically is that the security chip controls the displaying module to generate and display the keyboard according to the preset coordinate data; correspondingly, that the security chip obtains transaction amount data according to the transaction data coordinate information specifically is that the security chip obtains the transaction amount data according to the transaction data coordinate information and the preset coordinate data.

Or, that the security chip controls the displaying module to generate and display the keyboard can specifically is that the security chip generates random coordinate data according to the preset keyboard coordinates, controls the displaying module to generate and display the random number keyboard according to the random coordinate data; correspondingly, the security chip obtains the transaction amount data according to the transaction data coordinate information specifically is that the security chip obtains the transaction amount data according to the transaction data coordinate information and the random coordinate data.

Or, the security chip controls the displaying module to generate and display the keyboard specifically is that the security chip controls the displaying module to generate and display the keyboard according to the preset coordinate data; correspondingly, that the security chip obtains the transaction amount data according to the transaction data coordinate information specifically is that the security chip obtains the transaction data according to the transaction data coordinate information and the preset coordinate data. In Embodiment 4, the method that the security chip obtains the transaction data according to the transaction data coordinate information and the preset coordinate data is the same as that the security chip obtains the verification code according to the verification code coordinate information and the random coordinate data in Step S4 in Embodiment 4. No more details are given here.

Embodiment 5

Figure 6:
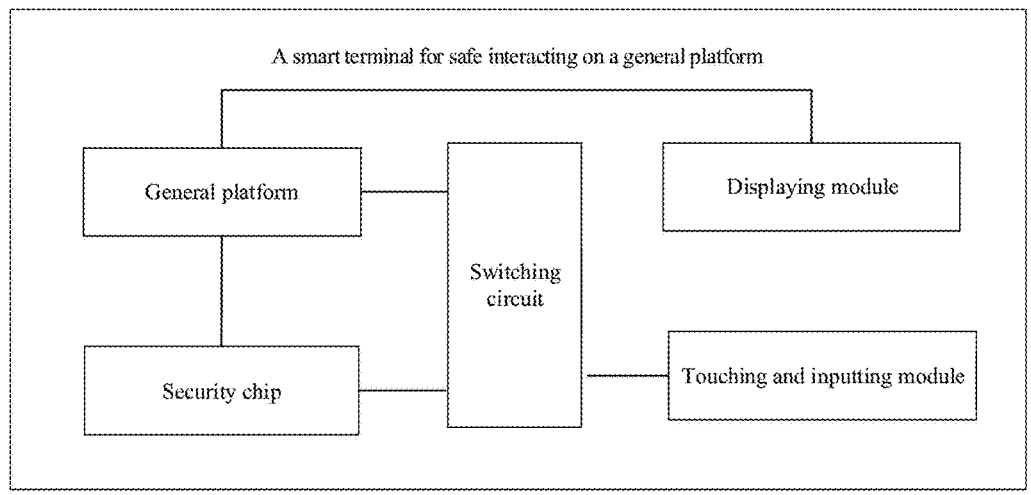
FIG. 6 is a diagram of a smart terminal for safe interacting on a general platform in Embodiment 5 of the present disclosure.

Embodiment 5 provides a method for safe interacting on a general platform, and the method is applied to a smart terminal including the general platform, a security chip, a switching circuit, a touching and inputting module and a displaying module; as shown in FIG. 6, the general platform is connected to the security chip via a security interface, the general platform and the security chip are connected to the touching and inputting module and the displaying module via the switching circuit; and the displaying module is connected to the general platform.

Figure 7:
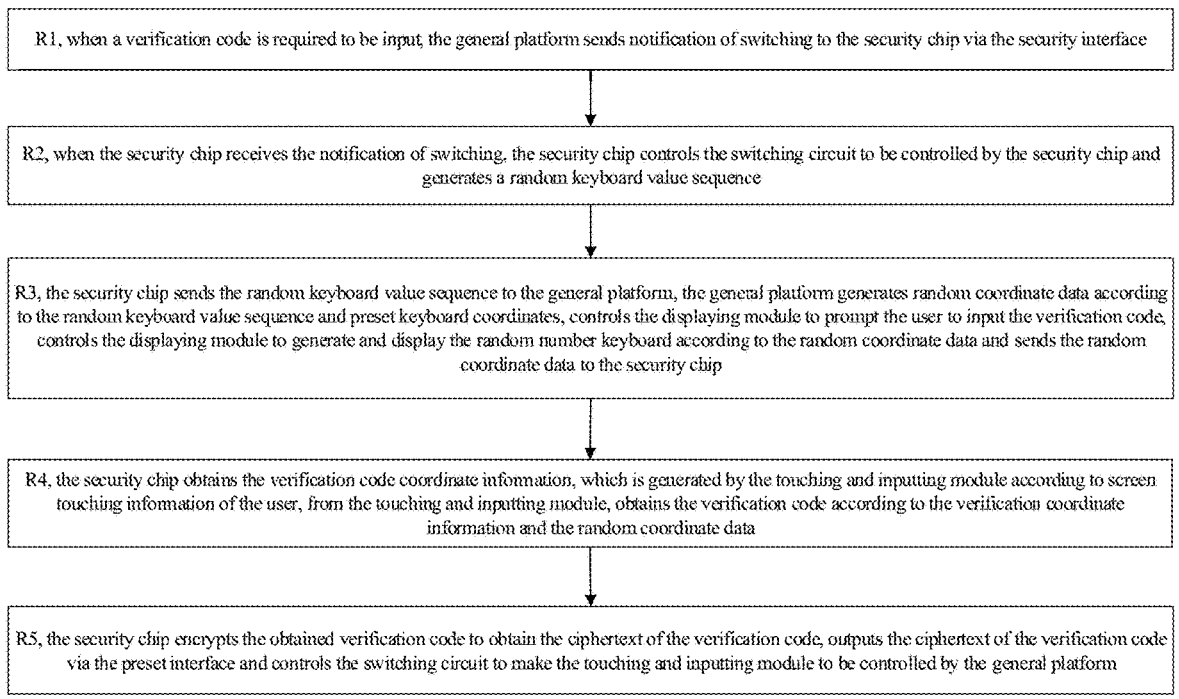
FIG. 7 is a flow chart of a method for safe interacting on a general platform in Embodiment 5 of the present disclosure.

As shown in FIG. 7, Embodiment 5 provides a method which includes the following steps:

Step R1, when a verification code is required to be input, the general platform sends a switching notification to the security chip via the security interface;

Step R2, when the security chip receives the switching notification, the security chip controls the switching circuit controlled by the security chip and generates a random keyboard value sequence;

Specifically, in Embodiment 5, the method that the security chip generates the random keyboard value sequence is the same as that in Embodiment 1. No more detail is given here.

Step R3, the security chip sends the random keyboard value sequence to the general platform, the general platform generates random coordinate data according to the random keyboard value sequence and preset keyboard coordinates, controls the displaying module to prompt the user to input the verification code, controls the displaying module to generate and display the random number keyboard according to the random coordinate data and sends the random coordinate data to the security chip;

Step R4, the security chip obtains the verification code coordinate information, which is generated by the touching and inputting module according to screen touching information of the user, from the touching and inputting module, obtains the verification code according to the verification coordinate information and the random coordinate data; and Step R5, the security chip encrypts the obtained verification code to obtain the verification code ciphertext, outputs the verification code ciphertext via the preset interface and controls the switching circuit to make the touching and inputting module controlled by the general platform.

In Step R5 of Embodiment 5, that when the preset interface is the security interface, the security chip outputs the verification code ciphertext via the preset interface specifically is that the security chip sends the verification code ciphertext to the general platform via the security interface; that when the preset interface is the financial IC card interface, the security chip outputs the verification code ciphertext via the preset interface specifically is that the security chip sends the verification code ciphertext to the financial IC card via the financial IC card interface.

In Embodiment 5, Steps R2-R3 can be replaced with, respectively, that, when the security chip receives the switching notification, the security chip controls the switching circuit to make the touching and inputting module controlled by the security chip and sends the notification that the switching is successful to the general platform via the security interface; and when the general platform receives the notification that switching is successful, the general platform generates a random keyboard value sequence, generates random coordinate data according to the random keyboard value sequence and the preset keyboard coordinates, controls the displaying module to prompt the user to input the verification code, controls the displaying module to generate and display the random number keyboard according to the random coordinate data, sends the random coordinate data to the security chip.

Specifically, in Embodiment 5, a control pin of the security chip is connected to a control end of the switching circuit, a first input end of the switching circuit is connected to the touching and inputting module, a second input end is connected to the displaying module, a first output end of the switching circuit is connected to a communicating pin of the security chip, a second output pin of the switching circuit is connected to the communicating pin of the general platform.

That the security chip controls the switching circuit to make the touching and inputting module controlled by the security chip includes that the security chip inputs high level signal to the control end of the switching circuit via the control pin of the security chip; when the control end of the switching circuit receives high level signal, the switching circuit controls the first input end and the second output end of the switching circuit to be connected with each other.

Correspondingly, that the security chip controls the switching circuit to make the touching and inputting module controlled by the general platform specifically is that the security chip inputs low level signal to the control end of the switching circuit via the control pin of the security chip; when the control end of the switching circuit receives low level signal, the switching circuit controls the first input end and the second output end of the switching circuit to be connected with each other.

Preferably, before the security chip obtains the verification code, the security chip performs following operation:

determining whether time between the time when the security chip controls the switching circuit makes the touching and inputting module controlled by the security chip and the current time overpasses a preset time, if yes, sending information of timeout to the general platform; otherwise, keeps on determining. For example, the preset time is 3 seconds.

In Embodiment 5, that the general platform generates the random keyboard value sequence specifically includes:

Step L11, the general platform obtains the preset keyboard value sequence, uses a maximum keyboard value in the preset keyboard value sequence to set an initial value of a first index value, uses a minimum keyboard value in the preset keyboard value sequence to set an initial value of a second index value, takes the preset keyboard value sequence as the current preset keyboard value sequence, takes the initial value of the first index value as a current first index value and takes the initial value of the second index value to be a current second index value.

For example, the general platform obtains the preset keyboard value sequence, i.e. 0x00, 0x01, 0x02, 0x03, 0x04, 0x05, 0x06, 0x07, 0x08, 0x09, uses the maximum keyboard value 9 in the preset keyboard value sequence to set the initial value of the first index value, uses the minimum keyboard value 0 in the preset keyboard value sequence to set the initial value of the second index value.

In Embodiment 5, the preset keyboard value sequence can be with keyboard values ranged from 0 to 9. For example, the preset keyboard value sequence can be 0x01, 0x08, 0x00, 0x02, 0x04, 0x03, 0x06, 0x05, 0x07, 0x09, or the preset keyboard value sequence can be 0x08, 0x04, 0x03, 0x01, 0x09, 0x00, 0x02, 0x06, 0x05, 0x07. For example, the preset keyboard value sequence can be 0x00, 0x01, 0x02, 0x03, 0x04, 0x05, 0x06, 0x07, 0x08, 0x09 in Embodiment 5.

Step L12, the general platform invokes a random number generating function to generate a random number with one byte, performs bitwise AND operation on the generated random number and the current first index value to obtain a bitwise AND operation result.

In Embodiment 5, that the general platform invokes the random generating function to generate a random number with one byte specifically is that the general platform invokes the random generating function, i.e. hwGenRand (&rnd, 1) to generate a random number with one byte via an application of generating random number or a real random source.

For example, the general platform invokes the random number generating function to generate a random number with one byte, i.e. 0x29; when the first index value is 9, the general platform performs bitwise AND operation on the generated random number, i.e. 0x29 and 9 to obtain a bitwise AND operation result, i.e. 0x01.

Step L13, the general platform finds the keyboard value corresponding to the position of the bitwise AND operation result from the current preset keyboard value sequence, takes the keyboard value as a keyboard value corresponding to the position of the current second index value in the random keyboard value sequence to obtain a current random keyboard value sequence.

For example, the general platform finds the keyboard value, i.e. 0x01, which corresponds to the bitwise AND operation result, i.e. 0x01, from the current preset keyboard value sequence, i.e. 0x00, 0x01, 0x02, 0x03, 0x04, 0x05, 0x06, 0x07, 0x08, 0x09, takes the found keyboard value, i.e. 0x01, as the keyboard value, i.e. 0x01, which corresponds to the second index value, i.e. 0 from the random keyboard value sequence to obtain the current random keyboard value sequence, i.e. 0x01.

Step L14, the general platform removes the keyboard value corresponding to the position of bitwise AND operation result in the preset keyboard value sequence, uses the keyboard value after the removed keyboard value in the preset keyboard value sequence to refill the position of the removed keyboard value, takes the sequence after refilling as the current preset keyboard value sequence, updates the current first index value and the current second index value, determines whether the updated current index value and the current second index value is beyond the number of keyboard values of the preset keyboard value sequence, if yes, take the current random keyboard value sequence as a final random keyboard value sequence; otherwise, go back to Step L12.

Specifically, that the general platform updates the current first index value specifically is that the general platform deduct 1 from the current first index value to obtain the updated current first index value; the security chip updates the current second index value is that the general platform adds 1 to the current first index value to obtain the updated current second index value.

Specifically, that the general platform determines whether the updated first index value and the current second index value overpass the number of the keyboard values of the preset keyboard value sequence is that the general platform determines whether the updated current first index value is less than 0 and determines whether the updated current second index value is more than 9.

For example, the general platform removes the keyboard value, i.e. 0x01, which corresponds to the position of the operation the current preset keyboard value sequence, i.e. 0x00, 0x01, 0x02, 0x03, 0x04, 0x05, 0x06, 0x07, 0x08, 0x09, refills the position of the removed keyboard value by using the keyboard value, i.e. 0x09, behind the removed keyboard value in the current preset keyboard value sequence, takes the keyboard sequence, i.e. 0x00, 0x09, 0x02, 0x03, 0x04, 0x05, 0x06, 0x07, 0x08, obtained after refilling as the current preset keyboard value sequence, updates the current first index value and the current second keyboard value to obtain the current first index value, i.e. 8, after updating and the current second index value, i.e. 1, after updating, determines that the updated current first index value, i.e. 8, and the updated current second index value, i.e. 1, do not overpass the number of the keyboard values of the preset keyboard value sequence, go back to Step W12.

For example, the final random keyboard value sequence is: 0x01, 0x09, 0x00, 0x08, 0x06, 0x07, 0x02, 0x03, 0x04, 0x05.

In Embodiment 5, that the general platform generates random coordinate data according to the random keyboard value sequence and the preset keyboard coordinates specifically includes that the general platform generates random coordinate data by assigning values to the preset keyboard coordinates. Further, the general platform assigns the random keyboard value sequence, the preset keyboard value of the backspace key, the preset keyboard value of the confirming key to the values of the preset keyboard coordinates to generate random coordinate data.

In Embodiment 5, the preset keyboard coordinates are specifically scope of the preset keyboard coordinate values.

For example, according to the random keyboard value sequence, i.e. 0x01, 0x09, 0x00, 0x08, 0x06, 0x07, 0x02, 0x03, 0x04, 0x05, the preset keyboard value, i.e. 0x0A, of the backspace key, the preset keyboard value, i.e. 0x0B, of the confirming key, and the preset keyboard coordinates as follows:

| | | |
|---|---|---|
| 0 × 00-0 × 04, 0 × 00-0 × 04 | 0 × 04-0 × 08, 0 × 00-0 × 04 | 0 × 08-0 × 12, 0 × 00-0 × 04 |
| 0 × 00-0 × 04, 0 × 04-0 × 08 | 0 × 04-0 × 08, 0 × 04-0 × 08 | 0 × 08-0 × 12, 0 × 04-0 × 08 |
| 0 × 00-0 × 04, 0 × 08-0 × 12 | 0 × 04-0 × 08, 0 × 08-0 × 12 | 0 × 08-0 × 12, 0 × 08-0 × 12 |
| 0 × 00-0 × 04, 0 × 12-0 × 16 | 0 × 04-0 × 08, 0 × 12-0 × 16 | 0 × 08-0 × 12, 0 × 12-0 × 16 | the general platform generates the random coordinate data, which is as follows:

| | | |
|---|---|---|
| 0 × 01, 0 × 00-0 × 04, 0 × 00-0 × 04 | 0 × 09, 0 × 04-0 × 08, 0 × 00-0 × 04 | 0 × 00, 0 × 08-0 × 12, 0 × 00-0 × 04 |
| 0 × 08, 0 × 00-0 × 04, 0 × 04-0 × 08 | 0 × 06, 0 × 04-0 × 08, 0 × 04-0 × 08 | 0 × 07, 0 × 08-0 × 12, 0 × 04-0 × 08 |
| 0 × 02, 0 × 00-0 × 04, 0 × 08-0 × 12 | 0 × 03, 0 × 04-0 × 08, 0 × 08-0 × 12 | 0 × 04, 0 × 08-0 × 12, 0 × 08-0 × 12 |
| 0 × 05, 0 × 00-0 × 04, 0 × 12-0 × 16 | 0 × 0A, 0 × 04-0 × 08, 0 × 12-0 × 16 | 0 × 0B, 0 × 08-0 × 12, 0 × 12-0 × 16 |

For example, the general platform controls the displaying module to prompt the user to input the verification code and controls the displaying module to generate and display the random number keyboard as the following table according to the random coordinate data.

| | | |
|---|---|---|
| Input verification code please | | |
| 1 | 9 | 0 |
| 8 | 6 | 7 |
| 2 | 3 | 4 |
| 5 | X | Ok |

When inputting the verification code, it displays as the following table:

| | | |
|---|---|---|
| | *** | |
| 1 | 9 | 0 |
| 8 | 6 | 7 |
| 2 | 3 | 4 |
| 5 | X | Ok |

Or, the general platform controls the displaying module to display an inputting box to prompt the user to input the verification code, controls the displaying module to generate and display the random number keyboard as the following table according to the random coordinate data.

| | | |
|---|---|---|
| 1 | 9 | 0 |
| 8 | 6 | 7 |
| 2 | 3 | 4 |
| 5 | X | Ok |

When inputting the verification, it displays as the following:

| | | |
|---|---|---|
| * | * | * |
| 1 | 9 | 0 |
| 8 | 6 | 7 |
| 2 | 3 | 4 |
| 5 | X | Ok |

In Embodiment 5, Step R4 specifically includes that
when the touching and inputting module receives screen touching information input by the user every time, the touching and inputting module generates verification code coordinate information according to the screen touching information, updates the data in its register by using the generated verification code coordinate information and sends an interruption notification to the security chip.

For example, the touching and inputting module receives the screen touching information input by the user, the touching and inputting module generates verification code coordinate information, i.e. 0x01, 0x01, according to the screen touching information, uses the verification code coordinate information, i.e. 0x01, 0x01, to update the data in its register.

Step R41, the security chip receives the interruption notification of the touching and inputting module and reads the verification code coordinate information from the register of the touching and inputting module.

For example, when the security chip receives the interruption notification, the security chip reads the verification code coordinate information, i.e. 0x01, 0x01, from the register of the touching and inputting module.

Step R42, the security chip finds the keyboard value, which corresponds to the read verification code coordinate information, from the random coordinate data; when the found keyboard value is number key, the security chip adds the found keyboard value, which is taken as one digit of the verification code, to the end of the current verification code sequence to obtain a new verification code sequence, takes the new verification code sequence as the current verification code sequence, and sends information of inputting data to the general platform, then going back to Step R41; when the found keyboard value is backspace key, sends information of deleting data to the general platform, then going back to Step R41; when the found keyboard value is confirming key, sends confirming information to the general platform, and takes the current verification code sequence as verification code, then going back to Step R5.

In Step R4, that the security chip receives the interruption notification from the touching and inputting module for the first time further includes that the security chip initializes the verification code sequence and takes the verification code sequence after initializing as current verification code sequence.

In Embodiment 5, the keyboard values of the number key are ranged from 0x00 to 0x09; the keyboard value of the backspace key is 0x0A; the keyboard value of the confirming key is 0x0B.

For example, when the verification code coordinate information read by the security chip from the register of the touching and inputting module is 0x01, 0x01, from the following random coordinate data,

| | | |
|---|---|---|
| 0 × 01, 0 × 00-0 × 04, 0 × 00-0 × 04 | 0 × 09, 0 × 04-0 × 08, 0 × 00-0 × 04 | 0 × 00, 0 × 08-0 × 12, 0 × 00-0 × 04 |
| 0 × 08, 0 × 00-0 × 04, 0 × 04-0 × 08 | 0 × 06, 0 × 04-0 × 08, 0 × 04-0 × 08 | 0 × 07, 0 × 08-0 × 12, 0 × 04-0 × 08 |
| 0 × 02, 0 × 00-0 × 04, 0 × 08-0 × 12 | 0 × 03, 0 × 04-0 × 08, 0 × 08-0 × 12 | 0 × 04, 0 × 08-0 × 12, 0 × 08-0 × 12 |
| 0 × 05, 0 × 00-0 × 04, 0 × 12-0 × 16 | 0 × 0A, 0 × 04-0 × 08, 0 × 12-0 × 16 | 0 × 0B, 0 × 08-0 × 12, 0 × 12-0 × 16 | the security chip finds the keyboard value 0x01 corresponding to the read verification code coordinate information 0x01, 0x01, the found keyboard value 0x01 is number key, takes the found key value 0x01 as the number key, adds the found keyboard value, i.e. 0x01, which is taken as one digit of the verification code, to the end of the current verification code sequence to obtain a new verification code sequence, i.e. 1, takes the new verification code sequence as the current verification code sequence, sends the information of inputting data to the general platform, go back to Step R41.

Specifically, that the security chip finds the keyboard value 0x01, which corresponds to the read verification code information, i.e. 0x01, 0x01, from the random coordinate data specifically includes that the security chip finds that the scope of coordinate value corresponding to the read verification code coordinate information, i.e. 0x01, 0x01, from the random coordinate data is 0x00-0x04, 0x00-0x04, finds the keyboard value 0x01 which corresponds to the scope of the coordinate value 0x00-0x04, x00-0x04.

When the verification code coordinate information read from the register of the touching and inputting module by the security chip is 0x04, 0x02, the found keyboard value is the keyboard value of the backspace key, i.e. 0x0A, the security chip sends backspace information to the general platform, then going back to Step R41.

Specifically, when the verification code coordinate information read from the register of the touching and inputting module by the security chip is 0x05, 0x14, that the found keyboard value is the keyboard value, i.e. 0x0A, of backspace key: when the verification code coordinate information read from the register of the touching and inputting module by the security chip is 0x05,0x14, the found coordinate value scope corresponding to 0x05, 0x14 is 0x04-0x08, 0x12-0x16; the found keyboard value corresponding to the coordinate value scope, i.e. 0x04-0x08, 0x12-0x16 is the keyboard value, i.e. 0x0A, of the backspace key.

When the verification code coordinate information read from the register of the touching and inputting module by the security chip is 0x09, 0x15, the found keyboard value is the keyboard value 0x0B of the confirming key, the security chip sends confirming information to the general platform and takes the current verification code sequence 123456 as the verification code, then execute Step R5. When the verification code obtained by the security chip is 123456, Step R5 is that the security chip encrypts the obtained verification code 123456 to obtain the verification code ciphertext, i.e. D3 7C F6 B3 1A B9 67 55; further, when the verification code obtained by the security chip is 123456, in Step R5, the security chip fills the obtained verification code 123456 and obtains the verification code data after filing, uses a preset key to encrypt the verification code data, which is obtained after filling, according to a preset algorithm, for example, 3DES algorithm, to obtain the verification code ciphertext, i.e. D3 7C F6 B3 1A B9 67 55.

Specifically, that when the verification code coordinate information read from the register of the touching and inputting module by the security chip is 0x09,0x15, the found keyboard value is keyboard value, i.e. 0x0B, of the confirming key specifically includes that when the verification code coordinate information read from the register of the touching and inputting module by the security chip is 0x09, 0x15, the coordinate value scope corresponding to 0x05, 0x14 is found and the keyboard value corresponding to the coordinate value scope 0x08-0x12, 0x12-0x16, which corresponds to the keyboard value, i.e. 0x0B, of the confirming key, is found.

Step R43, when the general platform receives information of inputting data, the general platform controls the displaying module to display inputting one digit of data; when the general platform receives information of backspace, the general platform controls the displaying module to display deleting one digit of data; when the general platform receives information of confirming, the general platform displays information that inputting verification code is completed.

Specifically, that when the verification code is required to be input, the general platform sends a switching notification to the security chip via the security interface specifically is that when the general platform receives a transaction notification, the general platform controls the displaying module to prompt the user to input the verification code and sends the switching notification to the security chip after executing application selecting, application initializing, application data reading and offline authentication.

Correspondingly, in Step R5, when the general platform receives the verification code ciphertext, the method further includes: organizing online transaction message according to the verification code ciphertext. Or, specifically, in Embodiment 5, that when the verification code is required to be input, the general platform sends the switching notification to the security chip via the security interface specifically is that when the general platform receives the request for obtaining verification code from the upper host, the general platform sends a switching notification to the security chip.

Correspondingly, in Step R5, when the general platform receives the verification code ciphertext, the method further includes that the general platform sends the verification code ciphertext to the upper host. In this case, when the upper host receives the verification code ciphertext, the upper host decrypts the verification code ciphertext to obtain the verification code, determines whether the obtained verification code is identical to the verification code stored by the general platform, if yes, verifying is successful, otherwise, verifying is failed.

A logon system is taken as an example for illustration. The smart terminal can be a mobile terminal specifically. The upper host can specifically is an upper layer application of the general platform, the upper layer application sends a request for obtaining verification code to the general platform, when the general platform receives the request for obtaining verification code, the general platform sends a switching notification to the security chip; when the general platform receives ciphertext of verification code from the security chip, the general platform returns the verification code ciphertext to the upper layer application. When the upper layer application receives the verification code ciphertext, the upper layer application decrypts the verification code ciphertext to obtain the verification code, determines whether the verification code obtained by decrypting is identical to the verification code stored by the upper layer application, if yes, verifying is successful; otherwise, verifying is not successful.

Preferably, when the verification code is required to be input, the method further includes that the general platform obtains transaction information.

Correspondingly, when the general platform controls the displaying module to prompt the user to input the verification code, the method further includes that the general platform controls the displaying module to display transaction amount according to transaction information.

Or, preferably, when the verification code is required to be input, the method further includes:
  Step C1, when transaction amount is required to be input, the general platform sends the switching notification to the security chip via the security interface;
  Step C2, when the security chip receives the switching notification, the security chip controls the switching circuit to make the displaying module controlled by the security chip, sends a notification that switching is successful to the general platform via the security interface;

Step C3, the general platform receives the notification that switching is successful, the general platform controls the displaying module to generate and display the keyboard, controls the displaying module to prompt the user to input transaction amount;

Step C4, the security chip obtains the transaction data coordinate information, which is generated by the touching and inputting module according to the screen touching information of the user, from the touching and inputting module and obtains the transaction data according to the transaction data coordinate information; and Step C5, the security chip sends the transaction data to the general platform via the security interface and controls the switching circuit to make the touching and inputting module and the displaying module controlled by the general platform.

When the general platform controls the displaying module to prompt the user to input the verification code, the method further includes that the general platform controls the displaying module to display transaction amount according to the transaction data.

For example, the smart terminal is a smart POS machine.

When the POS machine executes offline transaction, the general platform scans a pattern, such as a two divisional code or a bar code, to obtain the transaction information or obtains the transaction information input by the user via an inputting module of the smart POS machine or obtains the transaction information from the upper host; after the smart POS machine obtains the transaction information, the POS machine executes selecting application, initializing application, reading application data and offline authentication, then the smart POS machine sends the switching notification, transaction information and the request for obtaining verification code; the security chip executes Steps R2-R5 after receiving the switching notification, transaction information and the request for obtaining verification code; in Step R3, the general platform controls the displaying module to display transaction amount according the transaction information; when the security chip sends the verification code ciphertext to the general platform via the security interface in Step R5, after Step R5 the method further includes that the general platform sends the verification code ciphertext to the financial IC card, the financial IC card decrypts the verification code ciphertext to obtain the verification code, determines whether the verification code obtained by decryption is identical to the verification code stored by the financial IC card, if yes, verifying is successful and the financial IC card returns information that verifying is successful to the general platform; otherwise, verifying is not successful and the financial IC card sends information that verifying is not successful to the general platform; when the security chip sends the verification code ciphertext to the financial IC card via the financial IC card interface in Step R5, after Step R5 the method further includes that financial IC card decrypts the verification code ciphertext to obtain the verification code, determines whether the verification code obtained by decrypting is identical to the verification code stored by the financial IC card, if yes, verifying is successful and the financial card sends information that verifying is successful to the security chip; otherwise, verifying is not successful and the financial IC card sends information that verifying is failed to the security chip; the security chip sends information that verifying is successful or verifying is failed to the general platform; preferably, after the general platform receives information that verifying is successful or verifying is failed from the security chip, the general platform processes the information that verifying is successful or verifying is failed. For example, the general platform stores the information that verifying is successful or information that verifying is failed from the security chip; or the general platform generates offline transaction log according to the information that verifying is successful or information that verifying is failed.

When the smart POS machine executes online transaction, the smart POS machine scans a pattern, such as a two dimensional code or a bar code, to obtain transaction information or the smart POS machine obtains the transaction information input by the user via an inputting module of the POS machine; or the smart POS machine obtains the transaction information sent from the upper host; after the smart POS machine obtains the transaction information, the smart POS machine executes application selecting, application initializing, application data reading and offline authenticating, the smart POS machine sends the switching notification, the transaction information and the request for obtaining verification code; the security chip executes Steps R2-R5 after receiving the switching notification, transaction information and the request for obtaining verification code; and when Step R3 is executed, the security chip further controls the displaying module to display the transaction amount according to the transaction information; when the security chip sends the ciphertext of verification code to the general platform via the security interface in Step R5, after Step R5, when the general platform receives the verification code ciphertext, the method further includes that the general platform organizes online transaction message according to the verification code ciphertext. In this case, when the upper host receives the online transaction message, the upper host obtains the ciphertext of verification code from the online transaction message, decrypts the verification code ciphertext to obtain the verification code, determines whether the verification code obtained by decrypting is identical to the verification stored by the upper host, if yes, verifying is successful and the upper host returns information that verifying is successful to the general platform; otherwise, verifying is not successful and the upper host returns information that verifying is failed to the general platform.

Embodiment 6

Figure 8:
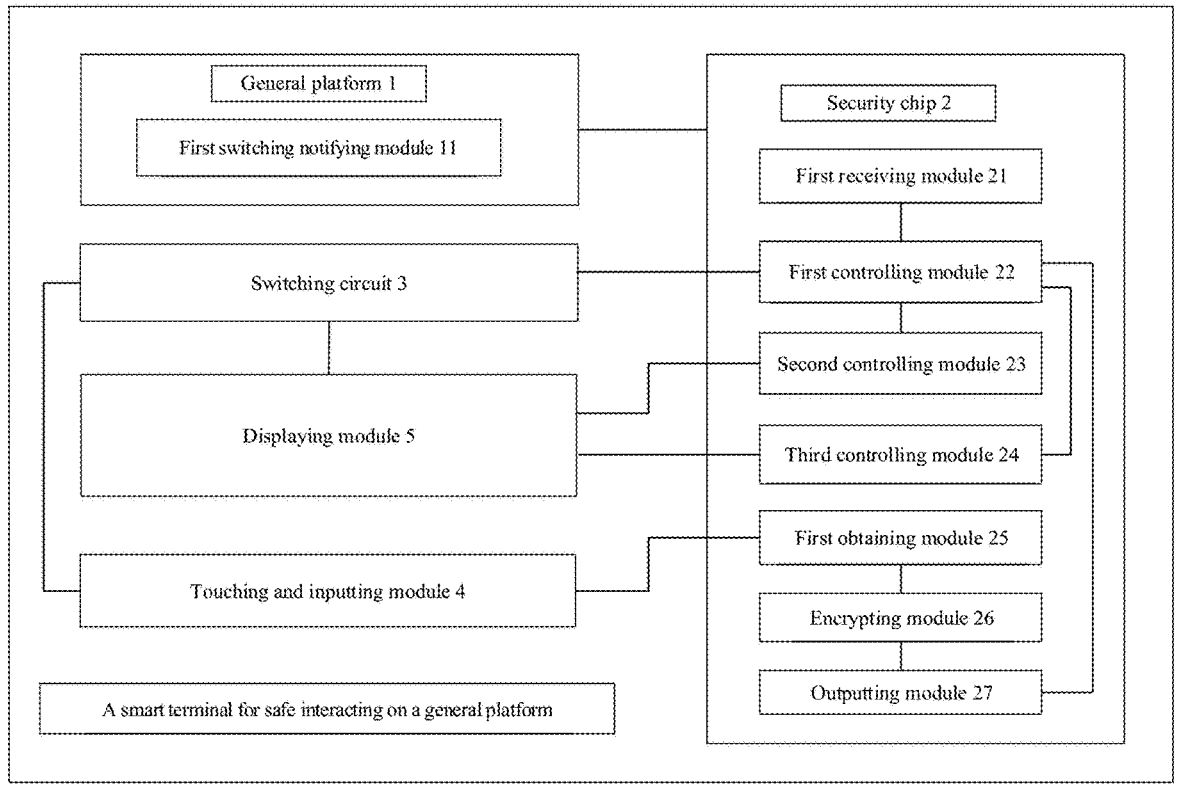
FIG. 8 is a block diagram of modules of a smart terminal for safe interacting on a general platform in Embodiment 6 of the present disclosure.

Embodiment 6 provides a smart terminal for safe interacting on a general platform 1. As shown in FIG. 8, the smart terminal is applied to the general platform 1, a security chip 2, a switching circuit 3, a touching and inputting module 4 and a displaying module 5; the general platform 1 is connected to the security chip 2 via a security interface, the general platform 1 and the security chip 2 are connected to the touching and inputting module 4 and the displaying module 5 via the switching circuit 3.

The general platform 1 includes:
a first switching notifying module 11 configured to send a switching notification to the security chip 2 via the security interface when a verification code is required to be input;

The security chip 2 includes:
a first receiving module 21 configured to receive the switching notification from the general platform 1;
a first controlling module 22 configured to, when the first receiving module 21 receives the switching notification, control the switching circuit 3 to make the touching and inputting module 4 and the displaying module 5 controlled by the security chip 2;

a second controlling module 23 configured to control the displaying module 5 to prompt the user to input a verification code after the first controlling module 22 controls the switching circuit 3 to make the touching and inputting module 4 and the displaying module 5 controlled by the security chip 2;

a third controlling module 24 configured to, after the first controlling module 22 controls the switching circuit 3 to make the touching and inputting module 4 and the displaying module 5 controlled by the security chip 2, control the displaying module 5 to generate and display a keyboard according to coordinated data;

a first obtaining module 25 configured to obtain verification coordinate information, which is generated according to touching information of a user by the touching and inputting module 4, from the touching and inputting module 4, and obtain a verification code according to the verification code coordinate information and the coordinate data;

Preferably, in Embodiment 6, after the first controlling module 22 controls the switching circuit 3 to make the touching and inputting module 4 and the displaying module 5 controlled by the security chip 2, the switching circuit 3 can be used as communicating channel between the touching and inputting module 4 and the displaying module 5 to the security chip 2; i.e. the second controlling module 23 controls the displaying module 5 to prompt the user to input a verification code via the communicating channel, i.e. the switching circuit; the third controlling module 24 controls the displaying module 5 to generate and display the keyboard via the communicating channel, i.e. the switching circuit; the first obtaining module 25 obtains the verification code coordinate information, which is generated according to the touching information of the user from the touching and inputting module 4 via the communicating channel, i.e. the switching circuit 3.

an encrypting module 26 configured to obtain the verification code ciphertext obtained by encrypting the verification code obtained by the first obtaining module 25;

an outputting module 27 configured to output the verification code ciphertext obtained by the encrypting module 26 via a preset interface;

the first controlling module 22 further is configured to, after the outputting module 27 outputs the verification code ciphertext obtained by the encrypting module 26 via the preset interface, control the switching circuit 3 to make the touching and inputting module 4 and the displaying module 5 controlled by the general platform 1.

Preferably, the security chip 2 further can include a first generating module;

the first generating module configured to, when the first receiving module the switching notification, generate random coordinate data according to preset keyboard coordinates.

Correspondingly, the third controlling module 24 specifically is configured to, after the first controlling module 22 controls the switching circuit 3 to make the touching and inputting module 4 and the displaying module 5 controlled by the security chip 2, control the displaying module 5 to generate and display a random number keyboard according to the random coordinate data generated by the first generating module.

The first obtaining module 25 specifically is configured to obtain the verification coordinate information, which is generated according to the screen touching information of the user by the touching and inputting module 4, from the touching and inputting module 4, obtain the verification code according to the verification code coordinate information and the random coordinate data generated by the first generating module.

Further, the first switching notifying module 11 is further configured to send the preset keyboard coordinates to the security chip 2 via the security interface.

Correspondingly, the first receiving module 21 is further configured to receive the preset keyboard coordinates of the general platform 1.

The first generating module specifically is configured to, when the first receiving module 21 receives the switching notification, generate random coordinate data according to the preset keyboard coordinates received by the first receiving module 21.

Specifically, the first generating module specifically includes:

a first generating unit configured to, when the first receiving module 21 receives the switching notification, generate a random keyboard sequence;

a second generating unit configured to generate random coordinate data according to the random keyboard value sequence generated by the first generating unit and the preset keyboard coordinates.

Further, specifically, the first generating unit specifically includes:

a first obtaining sub-unit configured to obtain a preset keyboard value sequence, set a maximum keyboard value in the preset keyboard value sequence obtained by the first obtaining sub-unit to be an initial value of a first index value, set a minimum keyboard value in the preset keyboard value sequence to be an initial value of a second index value, set the obtained preset keyboard value sequence as a current preset keyboard value sequence, take the initial value of the first index value as a current first index value, take the initial value of the second index value as a current second index value;

the generating sub-unit is configured to invoke a random number generating function to generate a random number with one byte, perform bitwise AND operation on the generated random number and the current first index value to obtain a bitwise AND operation result;

a finding and taking sub-unit is configured to find a keyboard value corresponding to the position of the bitwise AND operation result obtained by the first generating sub-unit from the current preset keyboard value sequence, take the found keyboard value as the keyboard value corresponding to the position of the current second index value in the random keyboard value sequence to obtain the current random keyboard value sequence;

a removing and refilling unit is configured to remove the keyboard value corresponding to the position of bitwise AND operation result in the current preset keyboard value sequence, use the keyboard value, which is behind the removed keyboard value in the current preset keyboard value sequence, to refill the position of the removed keyboard value, take a sequence obtained by refilling as the current preset keyboard value sequence;

an updating unit configured to, after the removing and refilling sub-unit takes the sequence obtained by refilling as the current preset keyboard value sequence, update the current first index value and the current second index value;

a determining sub-unit is configured to determine whether the current first index value and the current second index value after updating by the updating sub-unit overpass the number of the keyboard value of the preset keyboard value sequence;

a taking sub-unit configured to, when the determining sub-unit determines that determining result is yes, take the current random keyboard value sequence obtained by the removing and refilling sub-unit as a final random keyboard value sequence;

a first generating sub-unit further is configured to, when the determining sub-unit determines that determining result is no, invoke the random number generating function to generate a random number with one byte, perform bitwise AND operation on the generated random number and the current first index value to obtain the bitwise AND operation result.

Preferably, the general platform 1 further includes a third obtaining module;

the third obtaining module configured to obtain transaction information.

Correspondingly, the first switching notifying module 11 specifically is configured to, when a verification code is required to be input, sends the switching notification to the security chip 2 via the security interface, sends the transition information obtained by the third obtaining module to the security chip 2 via the security interface.

The first receiving module 21 further is configured to receive transaction information from the general platform 1.

The second controlling module 23 further is configured to, after the first controlling module 22 controls the switching circuit 3 to make the touching and inputting module 4 and the displaying module 5 controlled by the security chip 2, control the displaying module 5 to display the transaction amount according to the transaction information received by the first receiving module 21.

Or, preferably, the first switching notifying module 11 specifically is configured to, when the verification code is required to be input, send the switching notification to the security chip 2 via the security interface, send the request for obtaining verification code to the security chip 2 via the security interface.

Correspondingly, the first receiving module 21 further is configured to receive the request for obtaining verification code from the general platform 1.

The second controlling module 23 specifically is configured to, after the first controlling module 22 controls the switching circuit 3 to make the touching and inputting module 4 and the displaying module 5 controlled by the security chip 2, control the displaying module 5 to prompt the user to input the verification code according to the request for obtaining verification code received by the first receiving module 21.

The general platform 1 further includes:

a second switching notifying module configured to, when transaction amount is required to be input, send the switching notification and a request for obtaining transaction amount to the security chip 2 via the security interface.

The security chip 2 further includes:

a fourth receiving module configured to receive the switching notification and the request for obtaining transaction amount from the general platform 1;

an eighth controlling module configured to, when the fourth receiving module receives the switching notification and the request for obtaining transaction amount, control the switching circuit 3 to make the touching and inputting module 4 and the displaying module 5 controlled by the security chip 2;

a ninth controlling module configured to, after the eighth controlling module controls the switching circuit 3 to make the touching and inputting module 4 and the displaying module 5 controlled by the security chip 2, control the displaying module 5 to prompt the user to input the transaction amount according to the request for obtaining transaction amount received by the fourth receiving module;

a tenth controlling module configured to, after the eighth controlling module controls the switching circuit 3 to make the touching and inputting module 4 and the displaying module 5 controlled by the security chip 2, control the displaying module 5 to generate and display the keyboard;

a fourth obtaining module configured to, after the tenth controlling module controls the displaying module 5 to generate and display the keyboard, obtain the transaction data coordinate data, which is generated according to the screen touching information of the user by the touching and inputting module 4, from the touching and inputting module 4 and obtain the transaction amount data according to the transaction data coordinate information; and the fifth sending module configured to send the transaction amount data obtained by the fourth obtaining module to the general platform 1 via the security interface.

The eighth controlling module further configured to, after the fifth sending module sends the transaction amount data obtained by the fourth obtaining module to the general platform 1 via the security interface, control the switching circuit 3 to make the touching and inputting module 4 and the displaying module 5 controlled by the general platform 1, the second controlling module 23 further is configured to, after the first controlling module 22 controls the switching circuit 3 to make the touching and inputting module 4 and the displaying module 5 controlled by the security chip, control the displaying module 5 to display transaction amount according to the transaction amount data obtained by the fourth obtaining module.

Specifically, the tenth controlling module specifically is configured to, after the eighth controlling module controls the switching circuit 3 to make the touching and inputting module 4 and the displaying module 5 controlled by the general platform 1, generate random coordinate data according to the preset keyboard coordinates, control the displaying module 5 to generate and display a random number keyboard according to the random coordinate data; correspondingly, the fourth obtaining module specifically configured to, after the tenth controlling module controls the displaying module 5 to generate and display the random number keyboard according to the random coordinate data, obtain the transaction amount data according to the obtained transaction data coordinate information and the random coordinate data generated by the tenth controlling module.

Or, specifically, the tenth controlling module specifically configured to, after the eighth controlling module controls the switching circuit 3 to make the touching and inputting module 4 and the displaying module 5 controlled by the security chip 2, control the displaying module 5 to generate and display the keyboard according to the preset coordinate data; correspondingly, the fourth obtaining module is specifically configured to, after the tenth controlling module controls the displaying module 5 to generate and display the keyboard according to the preset coordinate data, obtain the transaction amount data according to the obtained transaction data coordinate information and the preset coordinate data.

Specifically, the touching and inputting module 4 receives the screen touching information input by the user every time, the touching and inputting module generates the verification code coordinate information according to the screen touching information, uses the generated verification code coordinate information to update the data in the register of the touching and inputting module 4 and send the interrupting notification to the security chip 2.

Correspondingly, the first obtaining module 25 specifically includes:
- a first receiving module configured to receive the interrupting notification of the touching and inputting module 4;
- a first obtaining module configured to, when the first receiving unit receives the interrupting notification of the touching and inputting module, read verification code coordinate information from the register of the touching and inputting module.
- a first finding/searching unit configured to find the keyboard value corresponding to the verification code coordinate information read by the first obtaining unit from the coordinate data;
- a first taking unit configured to, when the first finding/searching unit finds that the keyboard value is number key, take the found keyboard value as one digit of the verification code and add the keyboard value to the end of the current verification code sequence to obtain a new verification code sequence and take the new verification code sequence as current verification code sequence;
- a first controlling unit configured to, after the first taking unit takes the new verification code sequence as the current verification code sequence, control the displaying module 5 to display inputting one digit of data;
- a second controlling unit configured to, when the keyboard value found by the first finding/searching unit is a backspace key, control the displaying module to display deleting one digit of data;
- a third controlling unit configured to, when the keyboard value found by the first finding/searching unit is confirming key, control the displaying module 5 to display information that inputting verification code is completed and take the current verification code sequence as verification code;
- correspondingly, the encrypting module 26 specifically is configured to encrypt the verification code obtained by the third controlling unit to obtain the verification code ciphertext;
- a first initializing unit configured to, when the first receiving unit receives the interrupting notification of the touching and inputting module for the first time, initialize the verification code sequence and take the verification code sequence after initializing as the current verification code sequence.

In Embodiment 6, that the general platform 1 and the security chip 2 connect to the touching and inputting module 4 and the displaying module 5 via the switching circuit 3 can be replaced with that the general platform 1 and the security chip 2 connect to the touching and inputting module 4 via the switching circuit 2, the displaying module 5 connects to the general platform 1.

Correspondingly, the first controlling module 22 is replaced with the fourth controlling module, the second controlling module 23 of the security chip 2 can be replaced with the fifth controlling module of the general platform 1, the third controlling module 24 of the security chip can be replaced with the sixth controlling module of the general platform 1;

the fourth controlling module is configured to, when the first receiving module 21 receives the switching notification, control the switching circuit 3 to make the touching and inputting module 4 controlled by the security chip 2 and send the successful switching notification to the general platform 1 via the security interface.

The general platform 1 further includes a third receiving module; the third receiving module is configured to receive a notification that switching is successful from the security chip 2;
- the fifth controlling module configured to, when the third receiving module receives the notification that switching is successful from the security chip 2, control the displaying module 5 to prompt the user to input verification code; and
- the sixth controlling module configured to, when the third receiving module receives the successful switching notification of the security chip 2, control the displaying module 5 to generate and display the keyboard according to the coordinate data.

Preferably, in Embodiment 6, after the fourth controlling module controls the switching circuit 3 to make the touching and inputting module 4 controlled by the security chip 2, the switching circuit 3 can be used as the communicating channel between the touching and inputting module 4 and the security chip 2, and the switching circuit 3 can be used as the communicating channel between the displaying module 5 and the general platform 1; the fifth controlling module prompts the user to input the verification code via the communicating channel, i.e. switching circuit 3, the sixth controlling module controls the displaying module 5 to generate and display the keyboard via the communicating channel, i.e. the switching circuit 3, according to the coordinate data; the first obtaining module 25 obtains the verification coordinate information, which is generated according to the screen touching information of the user by the touching and inputting module 4, from the touching and inputting module 4 via the communicating channel, i.e. switching circuit 3.

The fourth controlling module further is configured to, after the outputting module 27 obtains the verification code ciphertext obtained by encrypting module 26 via the preset interface, control the switching circuit 3 to make the touching and inputting module 4 controlled by the general platform 1.

Preferably, the security chip 2 further includes a second generating module;
- the second generating module is configured to, when the first receiving module 21 receives the switching notification, generate the random keyboard sequence.

Correspondingly, the fourth controlling module further is configured to send the random keyboard value sequence generated by the second generating module to the general platform 1 via the security interface.

The general platform 1 further includes a third generating module;
- the third receiving module further configured to receive the random keyboard value sequence of the security chip 2;
- the third generating module configured to generate random coordinate data generated according to the random keyboard value sequence received from the third receiving module and the preset keyboard coordinates; and the sixth controlling module specifically is configured to, when the third receiving module receives the successful switching notification of the security chip 2, control the displaying module 5 to generate and display the random keyboard number board according to the random coordinate data generated by the third generating module.

The general platform 1 further includes a third sending module;

the third sending module configured to, after the sixth controlling module controls the displaying module 5 to generate and display the random number keyboard according to the random coordinate data generated by the third generating module, send the random coordinate data generated by the third generating module to the security chip 2 via the security interface;

the first receiving module 21 further is configured to receive the random coordinate data form the general platform 1; and the first obtaining module 25 specifically configured to obtain the verification code coordinate information, which is generated by the touching and inputting module according to the touching information of the user, from the touching and inputting module 4, obtain the verification code according to the verification code coordinate information and the coordinate data received by the first receiving module 21.

Specifically, the second generating module specifically includes:

a first obtaining sub-module configured to obtain the preset keyboard value sequence, set a maximum keyboard value in the obtained preset keyboard value sequence to be an initial value of the first index value, set the medium keyboard value in the preset keyboard value sequence as an initial value of the second index value, take the obtained preset keyboard value sequence as the current preset keyboard value sequence, take the initial value of the first index value as a first current index value, take the initial value of the second index value as the current second index value;

a first generating sub-module configured to invoke a random generating function to generate a random number with one byte, perform bitwise AND operation on the generated random number and the current first index value to obtain a bitwise AND operation result;

a first searching/finding and taking sub-module configured to find the keyboard value corresponding to the position of the bitwise AND operation result obtained from the first generating sub-module from the current preset keyboard value sequence, take the found keyboard value as the keyboard value corresponding to the current second index value in the random keyboard sequence to obtain the current random keyboard value sequence;

a removing and refilling sub-module is configured to remove the keyboard value corresponding to the position of the bitwise AND operation result in the current preset keyboard value sequence, use the keyboard value, which is behind the removed keyboard value in the current preset keyboard value sequence, to refill the position of the removed keyboard value, takes a sequence obtained by refilling as the current preset keyboard value sequence;

a first updating sub module configured to, after the first removing and refilling sub-unit takes the sequence obtained by refilling as the current preset keyboard value sequence, update the current first index value and the current second index value;

a first determining sub-module is configured to determine whether the current first index value and the current second index value overpass number of the preset keyboard value sequence after updating made by the first updating sub-module;

a first taking sub-module is configured to, when the first determining sub-module determines that determining result is yes, take a current random keyboard value sequence, which is obtained by the moving and refilling sub-module, as a final random keyboard value sequence; and a first generating sub-module is configured to, when the first determining sub-module determines that determining result is no, invoke a random number generating function to generate a random number with one byte, perform bitwise AND operation on the general random number and the current first index value to obtain a bitwise AND operation result.

Or, preferably, the general platform 1 further includes a fourth generating module and a fifth generating module;

the fourth generating module is configured to, when the third receiving module receives a notification of successful switching from the security chip, generate a random keyboard value sequence; and the fifth generating module is configured to generate random coordinate data according to a random keyboard value sequence and preset keyboard coordinates, which are generated by the fourth generating module.

Correspondingly, the sixth controlling module specifically is configured to, when the third receiving module receives notification of successful switching of the security chip 2, control the displaying module 5 to generate and display a random number keyboard according to the random coordinate data generated by the fifth generating module.

The general platform 1 further includes a fourth sending module;

the fourth sending module is configured to, after the sixth controlling module controls the displaying module 5 to generate and display the random number keyboard according to the random coordinate data generated by the fifth generating module, send the random coordinate data generated by the fifth generating module to the security chip 2;

the first receiving module 21 is further configured to receive the random coordinate data from the general platform 1; and the first obtaining module 25 specifically is configured to obtain the verification code coordinate information, which is generated by the touching and inputting module according to the screen touching information of the user, from the touching and inputting module and obtains the verification code according to the verification code coordinate information and the coordinate data received by the first receiving module 21.

Specifically, the fourth generating module specifically includes:

a second obtaining sub-module configured to obtain a preset keyboard value sequence, set a maximum keyboard value of the preset keyboard value sequence to be an initial value of the first index value, set a minimum keyboard value of the preset keyboard value sequence to the initial value of the second index value, take the obtained preset keyboard value sequence as a current preset keyboard value sequence, take the initial value of the first index value as a current first index value and take the initial value of the second index value as a current second index value;

a second generating sub-module configured to invoke a random number generating function to generate a random number with one byte, perform bitwise AND operation on the generated random number and the current first index value to obtain a bitwise AND operation result;

a second searching/finding and taking sub-module is configured to find a keyboard value corresponding to the position of the bitwise AND operation result, which is obtained by the second generating sub-module, from the current preset keyboard sequence, take the found keyboard value as the keyboard value which corresponds to the position of the current second index value in the random keyboard value sequence to obtain the current random keyboard value sequence;

a second moving and refilling sub-module is configured to remove the keyboard value, which is corresponding to the position of the result of bitwise AND operation, in the current preset keyboard value sequence, refill the position of the removed keyboard value by using the keyboard value behind the removed keyboard value in the current preset keyboard value sequence, take the keyboard sequence obtained by refilling as the current preset keyboard value sequence;

a second updating sub-module configured to, after the second moving and refilling sub-unit takes the sequence obtained by refilling as the current preset keyboard value sequence, update the current first index value and the current second keyboard value;

a second determining sub-module configured to determine whether the updated current first index value and the updated current second index value overpasses the number of the keyboard values of the preset keyboard value sequence;

a second taking sub-module configured to, when the determining result of the second determining sub-module is yes, take the current random keyboard value sequence obtained by the second removing and refilling sub-module as the final keyboard value sequence; and a second generating sub-module is further configured to, when the determining result of the second determining sub-module is no, invoke the random number generating function to generate a random number with one byte, perform bitwise AND operation on the generated random number and the current first index value to obtain a bitwise AND operation result.

Preferably, the general platform 1 further includes a fifth obtaining module; and the fifth obtaining module is configured to obtain transaction information.

Correspondingly, the fifth controlling module is further configured to, when the third receiving module receives the notification of successful switching from the security chip 2, display transaction amount according to the transaction information obtained by the fifth obtaining module.

Or, preferably, the general platform 1 further includes:
a third switching notifying module configured to, when the transaction amount is required to be input, send a switching notification to the security chip 2 via the security interface;
the fifth receiving module configured to receive notification of successful switching from the security chip 2;

the eleventh controlling module is configured to, when the fifth receiving module receives notification of successful switching from the security chip 2, control the displaying module 5 to generate and display the keyboard; and a twelfth controlling module configured to, when the fifth receiving module receives notification of successful switching from the security chip 2, control the displaying module 5 to prompt the user to input the transaction amount.

Correspondingly, the security chip 2 further includes:
a sixth receiving module configured to receive the switching notification from the general platform 1;
a thirteenth controlling module configured to, when the sixth receiving module receives the switching notification from the general platform 1, control the switching circuit 3 to make the touching and inputting module 4 controlled by the security chip 2, send notification of successful switching to the general platform 1; and
the six obtaining module configured to obtain the transaction data coordinate information, which is generated according to the screen touching information of the user by the touching and inputting module 4, from the touching and inputting module 4 and obtain the transaction data according to the transaction data coordinate information.

The sixth sending module configured to send the transaction data obtained by the sixth obtaining module to the general platform 1 via the security interface.

The thirteenth controlling module is further configured to, after the sixth sending module sends the transaction data obtained by the sixth obtaining module to the general platform 1 via the security interface, control the switching circuit 3 to make the general platform 1 controlled by the touching and inputting module 4 and the displaying module 5.

The fifth receiving module is further configured to receive transaction data from the security chip 2.

The fifth controlling module is further configured to, when the third receiving module receives the notification of successful switching from the security chip 2, control the displaying module 5 to display the transaction amount according to the transaction data received by the fifth receiving module.

Specifically, when the touching and controlling module 4 receives the screen touching information received by the user every time, the touching and inputting module generates verification code coordinate information according to the screen touching information, uses the verification code coordinate information generated to update the data in the register of the touching and inputting module 4 and sends an interruption notification to the security chip 2.

Correspondingly, the first obtaining module 25 specifically includes:
a second receiving unit configured to receive the interruption notification of the touching and inputting module 4;
a second obtaining unit configured to, when the second receiving unit receives the interruption notification of the touching and inputting module 4, read verification code coordinate information from the register of the touching and inputting module 4;
a second searching/finding unit configured to find a keyboard value corresponding to the verification code coordinate information read by the second obtaining unit from the coordinate data;

a second taking unit configured to, when the keyboard value found by the second finding unit is a number key, take the found key value as one digit of the verification code to the end of the current verification code sequence to obtain a new verification code sequence, take the new verification code sequence as the current verification code sequence;

a first sending unit configured to, after the second taking unit takes the new verification code sequence as the current verification code sequence, send information of inputting data to the general platform 1 via the security interface; when the keyboard value found by the second finding unit is backspace key, the second taking unit is configured to send backspace information to the general platform 1; when the found keyboard value is confirming key, the second taking unit is configured to send confirming information to the general platform 1;

a third taking unit configured to, when the found keyboard value is confirming key, take the current verification code sequence as verification code; and a second initializing unit configured to, when the second receiving unit receives the interruption notification of the touching and inputting module for the first time, initialize the verification code sequence and take the verification code sequence obtained by initializing as the current verification code sequence.

The general platform 1 further includes:

a receiving unit configured to receive the information from the security chip 2;

a controlling unit configured to control the displaying module 5 to display one digit of data when the receiving unit receives information of inputting data; to control the displaying module 5 to display deleting one digit of data when the receiving unit receives backspace information; to control the displaying module 5 to display information of completing verification code inputting when the receiving unit receives information of confirming information; and the encrypting module 26 specifically configured to encrypt the verification code obtained by the third taking unit to obtain the verification code ciphertext.

In Embodiment 6, that the general platform 1 and the security chip 2 connect to the touching and inputting module 5 and the displaying module 5 via the switching circuit 3 can be replaced with: the general platform 1 and the security chip 2 are connected to the displaying module 5 via the switching circuit 3, the touching and inputting module 4 is connected to the general platform 1.

Correspondingly, the first controlling module 22 is replaced with a seventh controlling module;

the seventh controlling module is configured to, when the first receiving module 21 receives a switching notification, control the switching circuit 3 to make the displaying module 5 controlled by the security chip 2.

The security chip 2 further includes a first sending module and a second receiving module. The first sending module is configured to, after the seventh controlling module controls the switching circuit 3 to make the displaying module 5 controlled by the security chip 2, send notification of successful switching to the general platform via the security interface.

The first obtaining module 25 in the security chip 2 is replaced with the second obtaining module of the general platform 1; the general platform 1 can further includes a second sending module.

The second obtaining module is configured to, when receiving the notification of successful switching of the security chip 2, generate verification code coordinate information, which is generated by the touching and inputting module 4 according to the screen touching information of the user, from the touching and inputting module 4.

Preferably, in Embodiment 6, after the seventh controlling module controls the switching circuit 3 to make the displaying module 5 controlled by the security chip 2, the switching circuit 3 can be taken as communication channel between the displaying module 5 and the security chip 2; and the switching circuit 3 can be taken as the communication channel between the touching and inputting module 4 and the general platform 1; that is, the second obtaining module obtains verification code coordinate information, which is generated by the touching and inputting module 4 according to the screen touching information of the user, from the touching and inputting module 4 via the switching circuit 3, i.e. the communication channel; the second controlling module 23 controls the displaying module 5 to prompt the user to input the verification code via the switching circuit, i.e. the communication channel; the third controlling module 23 controls the displaying module 5 to generate and display the keyboard according to the coordinate data via the switching circuit 3, i.e. the communicating channel The second sending module is configured to send the verification code obtained by the second obtaining module to the security chip 2 via the security interface.

The second receiving module is configured to receive the verification code from the general platform 1.

The encrypting module 26 is configured to encrypt the verification code received by the second receiving module to obtain the cipher text of the verification code.

The seventh controlling module is further configured to, after the outputting module 27 outputs the verification code ciphertext obtained by the encrypting module 26 via a preset interface, control the switching circuit 3 to make the displaying module 5 controlled by the general platform 1.

Preferably, the general platform 1 further includes:

a fourth switching notifying module configured to, when transaction amount is required to be input, send a switching notification to the security chip 2 via the security interface;

the seventh receiving module configured to receive the notification of successful switching from the security chip 2; and the seventh obtaining module configured to, when the seventh receiving module receives notification of successful switching from the security chip 2, obtain transaction data coordinate information, which is generated by the touching and inputting module 4 according to the screen touching information of the user, from the touching and inputting module, obtain transaction data according to the transaction data coordinate information.

Correspondingly, the security chip 2 further includes:

an eighth receiving module configured to receive the switching notification from the general platform 1;

a fourteenth controlling module configured to, when the eighth receiving module receives the switching notification of the general platform 1, control the switching circuit 3 to make the displaying module 5 controlled by the security chip 2, send a notification of successful switching to the general platform 1 via the security interface;

a fifteenth controlling module is configured to, after the fourteenth controlling module sends notification of successful switching to the general platform 1 via the security interface, control the displaying module 5 to generate and display a keyboard; and a sixteenth controlling module configured to, after the fourteenth controlling module sends notification of successful switching to the general platform 1 via the security chip, control the displaying module 5 to prompt the user to input the transaction amount.

The first switching notifying module 11 is further configured to, when a verification code is required to be input, send the transaction data obtained by the seventh obtaining module to the security chip 2 via the security interface;

the first receiving module 21 is further configured to receive the transaction data from the general platform 1; and the second controlling module 23 is further configured to control the displaying module 5 to display transaction amount according to the transaction data received by the first receiving module 21.

In Embodiment 6, the outputting module 27 specifically is configured to, when the preset interface is security interface, send the ciphertext of verification code to the general platform 1 via the security interface.

Or, the outputting module 27 specifically is configured to, when the preset interface is financial IC card interface, send the verification code ciphertext to the financial IC card via the financial IC card interface.

The above are only preferred embodiments of the present disclosure, however, the scope of protection of the present disclosure is not limited thereto. Any modification or substitution that can be easily envisaged by those of skill in the art within the technical scope disclosed by the present disclosure is intended to be included within the protection scope of the present disclosure. Therefore, the scope of protection of the present disclosure should be based on the scope of protection of the appended claims.

The invention claimed is:

1. A method for safely interacting on a general platform of open source for mobile devices, wherein the method is applied to a smart terminal comprising the general platform, a security chip, a switching circuit, a touching and inputting module and a displaying module, said switching circuit is used as a communicating channel among the security chip, the touching and inputting module, and the displaying module; the general platform is connected to the security chip via a security interface, the general platform and the security chip are connected to the touching and inputting module and the displaying module via the switching circuit; the method specifically comprises the following steps:

S1) sending, by the general platform, a switching notification to the security chip via the security interface when a verification code is required to be input;

S2) controlling, by the security chip, the switching circuit to make the touching and inputting module and the displaying module controlled by the security chip when the security chip receives the switching notification;

S3) controlling, by the security chip, the displaying module to prompt a user to input a verification code and controlling the displaying module to generate and display a keyboard according to coordinate data;

S4) obtaining, by the security chip, verification code coordinate information, which is generated by the touching and inputting module according to screen touching information of the user, from the touching and inputting module, and obtaining the verification code according to the verification code coordinate information and the coordinate data; and S5) encrypting, by the security chip, the obtained verification code so as to obtain a verification code ciphertext, outputting the verification code ciphertext via a preset interface, controlling the switching circuit to make the touching and inputting module and the displaying module controlled by the general platform.

2. The method of claim 1, wherein

Step S2 further comprises: generating, by the security chip, random coordinate data according to preset keyboard coordinates when the security chip receives the switching notification in Step S2;

in Step S3, controlling, by the security chip, the displaying module to generate and display the keyboard according to the coordinate data specifically is: contrailng, by the security chip, the displaying module to generate and display a random number keyboard according to the random coordinate data; and in Step S4, obtaining, by the security chip, the verification code according to the verification code coordinate information and the coordinate data specifically is: obtaining, by the security chip, the verification code according to the verification code coordinate information and the random coordinate data.

3. The method of claim 2, wherein

Step S1 further comprises: sending, by the general platform, the preset keyboard coordinates to the security chip via the security interface; and generating, by the security chip, random coordinate data according to a preset keyboard coordinates specifically comprises: generating, by the security chip, the random coordinate data according to the received preset keyboard coordinates.

4. The method of claim 1, wherein before a verification code is required to be input, the method further comprises: obtaining, by the general platform, transaction information;

when the verification code is required to be input, the method further comprises: sending, by the general platform, the transaction information to the security chip via the security interface; and Step S3 further comprises: controlling, by the security chip, the displaying module to display transaction amount according to the transaction information.

5. The method of claim 1, wherein when the verification code is required to be input, the method further comprises: sending, by the general platform, a request for obtaining verification code to the security chip via the security interface;

controlling, by the security chip, the displaying module to prompt the user to input the verification code specifically comprises: controlling, by the security chip, the displaying module to prompt the user to input the verification code according to the request for obtaining verification code;

before the verification code is required to be input, the method further comprises the following steps:

A1) sending, by the general platform, the switching notification and a request for obtaining transaction amount to the security chip via the security interface when a transaction amount is required to be input;

A2) controlling, by the security chip, the switching circuit to make the touching and inputting module and the displaying module controlled by the security chip when the security chip receives the switch notification and the request for obtaining transaction amount;

A3) controlling, by the security chip, the displaying module to prompt the user to input the transaction amount according to the request for obtaining the transaction amount, and controlling the displaying module to generate and display the keyboard; and A4) obtaining, by the security chip, transaction data coordinate information generated by the touching and inputting module according to the screen touching information of the user from the touching and inputting module, obtaining the transaction amount data according to the transaction data coordinate information, sending the transaction amount data to the general platform via the security interface, and controlling the switching circuit to make the touching and inputting module and the displaying module controlled by the general platform;

Step S3 further comprises: controlling, by the security chip, the displaying module to display the transaction amount according to the transaction amount data.

6. A smart terminal for safely interacting on a general platform of open source for mobile devices, wherein the smart terminal is applied to a smart terminal comprising the general platform, a security chip, a switching circuit, a touching and inputting module and a displaying module, said switching circuit is used as a communicating channel among the security chip, the touching and inputting module, and the displaying module; the general platform is connected to the security chip via the security interface, and the general platform and the security chip are connected to the touching and inputting module and the displaying module via the switching circuit;

the general platform comprises:
a first switching notifying module configured to, when a verification code is required to be input, send a switching notification to the security chip via the security interface;

the security chip comprises:
a first receiving module configured to receive the switching notification from the general platform;
a first controlling module configured to, when the first receiving module receives the switching notification, control the switching circuit to make the touching and inputting module and the displaying module controlled by the security chip;
a second controlling module configured to control the displaying module to prompt a user to input a verification code after the first controlling module controls the switching circuit to make the touching and inputting module and the displaying module controlled by the security chip;
a third controlling module configured to control the displaying module to generate and display a keyboard according to coordinate data after the first controlling module controls the switching circuit to make the touching and inputting module and the displaying module controlled by the security chip,
a first obtaining module is configured to obtain verification code coordinate information, which is generated by the touching and inputting module according to screen touching information of the user, from the touching and inputting module, and obtain the verification code according to the verification code coordinate information and the coordinate data;
an encrypting module configured to encrypt the verification code obtained by the first obtaining module so as to obtain verification code ciphertext, and
an outputting module configured to output the verification code ciphertext obtained by the encrypting module via a preset interface; and the first controlling module further configured to, after the outputting module outputs the verification code ciphertext obtained by the encrypting module via the preset interface, control the switching circuit to make the touching and inputting module and the displaying module controlled by the general platform.

7. The smart terminal of claim 6, wherein the security chip further comprises a first generating module;
the first generating module is configured to, when the first receiving module receives the switching notification, generate random coordinate data according to preset keyboard coordinates;
the third controlling module is specifically configured to, after the first controlling module controls the switching circuit to make the touching and inputting module and the displaying module controlled by the security chip, control the displaying module to generate a random number keyboard according to the random coordinate data generated by the first generating module; and
the first obtaining module is specifically configured to obtain the verification code coordinate information, which is generated by the touching and inputting module according to the screen touching information of the user, from the touching and inputting module, and obtain the verification code according to the verification code coordinate information and the random coordinate data generated by the first generating module.

8. The smart terminal of claim 7, wherein
the first switching notifying module is further configured to send the preset keyboard coordinates to the security chip via the security interface;
the first receiving module is further configured to receive the preset keyboard coordinates from the general platform; and
the first generating module is specifically configured to, when the first receiving module receives the switching notification from the first receiving module, generate the random coordinate data according to the preset keyboard coordinates received by the first receiving module.

9. The smart terminal of claim 6, wherein the general platform further comprises a third obtaining module:
the third obtaining module is configured to obtain transaction information;
the first switching notifying module is specifically configured to, when a verification code is required to be input, send a switching notification to the security chip via the security interface, and send the transaction information obtained by the third obtaining module to the security chip via the security interface;
the first receiving module is further configured to receive the transaction information from the general platform; and
the second controlling module is further configured to, after the first controlling module controls the switching circuit to make the touching and inputting module and the displaying module controlled by the security chip, control the displaying module to display transaction amount according to the transaction information received by the first receiving module.

10. The smart terminal of claim 6, wherein
the first switching notifying module is specifically configured to, when the verification code is required to be input, send a switching notification to the security chip via the security interface, and send the request for obtaining verification code to the security chip via the security interface;

the first receiving module further is configured to receive the request for obtaining the verification code from the general platform;

the second controlling module is specifically configured to, after the first controlling module controls the switching circuit to make the touching and inputting module and the displaying module controlled by the security chip, control the displaying module to prompt the user to input a verification code according to the request for obtaining verification code received by the first receiving module;

the general platform further comprises:

a second switching notifying module configured to, when transaction amount is required to be input, send the switching notification and the requirement of obtaining the transaction amount to the security chip via the security interface;

the security chip further comprises:

the fourth receiving module configured to receive the switching notification and requirement of obtaining the transaction amount from the general platform;

the eighth controlling module is configured to, when the fourth receiving module receives the switching notification and the requirement of obtaining the transaction amount, control the switching circuit to make the touching and inputting module and the displaying module controlled by the security chip;

the ninth controlling module configured to, after the eighth controlling module controls the switching circuit to make the touching and inputting module and the displaying module controlled by the security chip, control the displaying module to prompt the user to input the transaction amount according to the requirement of obtaining the transaction amount received by the fourth receiving module;

a tenth controlling module configured to, after the eighth controlling module controls the switching circuit to make the touching and inputting module and the displaying module controlled by the security chip, control the displaying module to generate and display the keyboard;

a fourth obtaining module configured to, after the tenth controlling module controls the displaying module to generate and display the keyboard, obtain the transaction data coordinate information generated by the touching and inputting module according to the screen touching information of the user from the touching and inputting module, and obtain the transaction amount data according to the transaction data coordinate information;

a fifth sending module configured to send the transaction amount data obtained by the fourth obtaining module to the general platform via the security interface;

the eighth controlling module further configured to, after the fifth sending module sends the transaction amount data obtained by the fourth obtaining module to the general platform via the security interface, control the switching circuit to make the touching and inputting module and the displaying module controlled by the general platform; and the second controlling module further configured to, after the first controlling module controls the switching circuit to make the touching and inputting module and the displaying module controlled by the security chip, control the displaying module to display the transaction amount according to the transaction amount data obtained by the fourth obtaining module.

* * * * *